US012714222B1

(12) United States Patent
Williams et al.

(10) Patent No.: US 12,714,222 B1
(45) Date of Patent: Aug. 25, 2026

(54) SYSTEM AND METHOD FOR AUTOMATICALLY SETTING PREFERRED WORKSTATION HEIGHTS TO INCREASE HUMAN MOVEMENT AND PROMOTE WELLNESS

(71) Applicant: Steelcase Inc., Grand Rapids, MI (US)

(72) Inventors: Matthew J. Williams, Rockford, MI (US); Tracy D. Lockwood, Wyoming, MI (US)

(73) Assignee: Steelcase Inc., Grand Rapids, MI (US)

( * ) Notice: Subject to any disclaimer, the term of this patent is extended or adjusted under 35 U.S.C. 154(b) by 356 days.

(21) Appl. No.: 18/224,369

(22) Filed: Jul. 20, 2023

(51) Int. Cl.
*A47B 21/02* (2006.01)
*A47B 9/20* (2006.01)
(Continued)

(52) U.S. Cl.
CPC ................ *A47B 21/02* (2013.01); *A47B 9/20* (2013.01); *A47B 97/00* (2013.01); *A47C 3/20* (2013.01);
(Continued)

(58) Field of Classification Search
CPC ... A47B 21/02; A47B 9/20; A47B 2200/0056; A47B 2200/0061; A47B 2200/0062; F16M 11/046
See application file for complete search history.

(56) References Cited

U.S. PATENT DOCUMENTS 2,561,481 A 7/1951 Rody
2,580,598 A 1/1952 Rody
(Continued)

FOREIGN PATENT DOCUMENTS

CN 202286910 U 7/2012
DE 19604329 A1 8/1997
(Continued)

OTHER PUBLICATIONS

Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, Copyright 2016, 4 pages.
(Continued)

*Primary Examiner* — Mong-Shune Chung
(74) *Attorney, Agent, or Firm* — Quarles & Brady LLP

(57) ABSTRACT

A system and method for adjusting a position of an article of furniture, the system comprising an article of furniture including at least a first element that is moveable with respect to a second element, a memory storing a first preferred position and a second preferred position, a user interface for receiving automatic position change commands and manual position change commands and a processor programmed to perform the steps of, (a) upon receiving an automatic position change command via the user interface to change position to the first preferred position, changing the position of the first element to the first preferred position, (b) upon receiving a manual position change command via the user interface to move the first element to a third position that is different than the first preferred position and the second preferred position, (i) changing the position of the first element to the third position, (ii) determining that the third position is in one of a first position range or a second position range, (iii) when the third position is in the first position range, storing the third position as the first preferred position, (iv) when the third position is in the second position range, storing the third position as the second preferred position and repeating steps (a) and (b).

22 Claims, 12 Drawing Sheets

(51) Int. Cl.

| | |
|---|---|
| ***A47B 97/00*** | (2006.01) |
| ***A47C 3/20*** | (2006.01) |
| ***F16M 11/04*** | (2006.01) |
| ***F16M 11/10*** | (2006.01) |

(52) U.S. Cl.

CPC ......... *F16M 11/046* (2013.01); *F16M 11/048* (2013.01); *F16M 11/10* (2013.01); *A47B 2200/0056* (2013.01); *A47B 2200/0061* (2013.01); *A47B 2200/0062* (2013.01); *A47B 2200/0066* (2013.01)

(56) References Cited

U.S. PATENT DOCUMENTS 3,953,770 A 4/1976 Hayashi
4,163,929 A 8/1979 Janu et al.
4,440,096 A 4/1984 Rice et al.
4,571,682 A 2/1986 Silverman et al.
4,654,756 A 3/1987 Wilson et al.
4,779,865 A 10/1988 Lieberman et al.
4,821,118 A 4/1989 Lavaliere
4,828,257 A 5/1989 Dyer et al.
4,849,733 A 7/1989 Conigliaro et al.
4,894,600 A 1/1990 Kearney
4,931,978 A 6/1990 Drake et al.
5,019,950 A 5/1991 Johnson
5,022,384 A 6/1991 Freels et al.
5,089,998 A 2/1992 Rund
5,140,977 A 8/1992 Raffel
5,224,429 A 7/1993 Borgman et al.
5,231,562 A 7/1993 Pierce et al.
5,259,326 A 11/1993 Borgman et al.
5,305,238 A 4/1994 Starr, III et al.
5,308,296 A 5/1994 Eckstein
5,314,391 A 5/1994 Potash et al.
5,323,695 A 6/1994 Borgman et al.
5,335,188 A 8/1994 Brisson
5,371,693 A 12/1994 Nakazoe
5,412,297 A 5/1995 Clark et al.
5,435,799 A 7/1995 Lundin
5,456,648 A 10/1995 Edinburg et al.
5,485,376 A 1/1996 Oike et al.
5,516,298 A 5/1996 Smith
5,575,668 A 11/1996 Timmerman
5,583,831 A 12/1996 Churchill et al.
5,612,869 A 3/1997 Letzt et al.
5,638,759 A 6/1997 Klugkist
5,663,620 A 9/1997 Mizuno et al.
5,666,426 A 9/1997 Helms
5,686,884 A 11/1997 Larkin et al.
5,765,910 A 6/1998 Larkin et al.
5,769,755 A 6/1998 Henry et al.
5,853,005 A 12/1998 Scanlon
5,857,986 A 1/1999 Moriyasu
5,870,647 A 2/1999 Nada et al.
5,890,997 A 4/1999 Roth
5,917,420 A 6/1999 Gonzalez
5,944,633 A 8/1999 Wittrock
6,013,008 A 1/2000 Fukushima
6,014,572 A 1/2000 Takahashi
6,030,351 A 2/2000 Schmidt et al.
6,032,108 A 2/2000 Sciple et al.
6,075,755 A 6/2000 Zarchan
6,135,951 A 10/2000 Richardson et al.
6,142,910 A 11/2000 Heuvelman
6,161,095 A 12/2000 Brown
6,183,280 B1 2/2001 Laukhuf
6,202,567 B1 3/2001 Funk et al.
6,244,988 B1 6/2001 Delman
6,286,441 B1 9/2001 Burdi et al.
6,296,408 B1 10/2001 Larkin et al.
6,312,363 B1 11/2001 Watterson et al.
6,360,675 B1 3/2002 Jones
6,447,424 B1 9/2002 Ashby et al.
6,458,060 B1 10/2002 Watterson et al.
6,527,674 B1 3/2003 Clem
6,595,144 B1 7/2003 Doyle
6,622,116 B2 9/2003 Skinner et al.
6,669,286 B2 12/2003 Iusim
6,702,719 B1 3/2004 Brown et al.
6,716,139 B1 4/2004 Hosseinzadeh-Dolkhani et al.
6,746,371 B1 6/2004 Brown et al.
6,749,537 B1 6/2004 Hickman
6,783,482 B2 8/2004 Oglesby et al.
6,790,178 B1 9/2004 Mault et al.
6,793,607 B2 9/2004 Neil
6,806,664 B2 10/2004 Beishline
6,812,833 B2 11/2004 Rothkop et al.
6,870,477 B2 3/2005 Gruteser et al.
6,964,370 B1 11/2005 Hagale et al.
6,977,476 B2 12/2005 Koch
6,987,221 B2 1/2006 Platt
7,005,884 B2 2/2006 Gunton
7,030,735 B2 4/2006 Chen
7,049,728 B2 5/2006 Bastholm
7,063,644 B2 6/2006 Albert et al.
7,070,539 B2 7/2006 Brown et al.
7,083,421 B1 8/2006 Mori
7,097,588 B2 8/2006 Watterson et al.
7,128,693 B2 10/2006 Brown et al.
7,141,026 B2 11/2006 Aminian et al.
7,161,490 B2 1/2007 Huiban
7,172,530 B1 2/2007 Hercules
7,191,713 B2 3/2007 Gayhart et al.
7,301,463 B1 11/2007 Paterno
7,327,442 B1 2/2008 Fear et al.
7,439,694 B2 10/2008 Atlas et al.
7,439,956 B1 10/2008 Albouyeh et al.
7,510,508 B2 3/2009 Santomassimo et al.
7,523,905 B2 4/2009 Timm et al.
7,538,284 B2 5/2009 Nielsen et al.
7,594,873 B2 9/2009 Terao et al.
7,605,330 B1 10/2009 Black et al.
7,614,001 B2 11/2009 Abbott et al.
7,628,737 B2 12/2009 Kowallis et al.
7,635,324 B2 12/2009 Balis
7,637,847 B1 12/2009 Hickman
7,640,866 B1 1/2010 Schermerhorn
7,645,212 B2 1/2010 Ashby et al.
7,652,230 B2 1/2010 Baier
7,661,292 B2 2/2010 Buitmann et al.
7,665,255 B2 2/2010 Dressendorfer et al.
7,681,949 B2 3/2010 Nathan et al.
7,713,172 B2 5/2010 Watterson et al.
7,717,827 B2 5/2010 Kurunmaki et al.
7,722,503 B1 5/2010 Smith et al.
7,735,918 B2 6/2010 Beck
7,857,731 B2 12/2010 Hickman et al.
7,871,280 B2 1/2011 Henriott
7,884,808 B2 2/2011 Joo
7,892,148 B1 2/2011 Stauffer et al.
7,901,224 B1 3/2011 Black et al.
7,909,737 B2 3/2011 Ellis et al.
7,914,468 B2 3/2011 Shalon et al.
7,931,563 B2 4/2011 Shaw et al.
7,955,219 B2 6/2011 Birrell et al.
8,001,472 B2 8/2011 Gilley et al.
8,024,202 B2 9/2011 Carroll et al.
8,047,914 B2 11/2011 Morrow
8,047,966 B2 11/2011 Dorogusker et al.
8,051,782 B2 11/2011 Nethken et al.
8,052,580 B2 11/2011 Saalasti et al.
8,092,346 B2 1/2012 Shea
8,105,209 B2 1/2012 Lannon et al.
8,109,858 B2 2/2012 Redmann
8,113,990 B2 2/2012 Kolman et al.
8,141,947 B2 3/2012 Nathan et al.
8,159,335 B2 4/2012 Cox, Jr.
8,167,776 B2 5/2012 Annon et al.
8,206,325 B1 6/2012 Najafi et al.
8,257,228 B2 9/2012 Quatrochi et al.
8,361,000 B2 1/2013 Gaspard
8,381,603 B2 2/2013 Peng et al.
8,432,356 B2 4/2013 Chase

(56) References Cited

U.S. PATENT DOCUMENTS 8,462,921 B2 6/2013 Parker
8,477,039 B2 7/2013 Gleckler et al.
8,522,695 B2 9/2013 Ellegaard
8,540,641 B2 9/2013 Kroll et al.
8,550,820 B2 10/2013 Soltanoff
8,560,336 B2 10/2013 Schwarzberg et al.
8,593,286 B2 11/2013 Razoumov et al.
8,595,023 B2 11/2013 Kirchhoff et al.
8,596,716 B1 12/2013 Caruso
8,620,617 B2 12/2013 Yuen et al.
8,668,045 B2 3/2014 Cohen
8,688,467 B2 4/2014 Harrison et al.
8,690,578 B1 4/2014 Nusbaum et al.
8,690,735 B2 4/2014 Watterson et al.
8,700,690 B2 4/2014 Raghav et al.
8,771,222 B2 7/2014 Kanderian, Jr. et al.
8,812,096 B2 8/2014 Flaherty et al.
8,814,754 B2 8/2014 Weast et al.
8,818,782 B2 8/2014 Thukral et al.
8,821,350 B2 9/2014 Maertz
8,825,482 B2 9/2014 Hernandez-Abrego et al.
8,836,500 B2 9/2014 Houvener et al.
8,847,988 B2 9/2014 Geisner et al.
8,947,215 B2 2/2015 Mandel et al.
8,965,541 B2 2/2015 Martinez et al.
8,984,685 B2 3/2015 Robertson et al.
8,997,588 B2 4/2015 Taylor
9,049,923 B1 6/2015 Delagey et al.
9,084,475 B2 7/2015 Hjelm
9,089,209 B2 7/2015 Matthai et al.
9,119,568 B2 9/2015 Yin et al.
9,167,894 B2 10/2015 DesRoches et al.
9,196,175 B2 11/2015 Walsh et al.
9,236,817 B2 1/2016 Strothmann et al.
9,326,597 B2 5/2016 Lukas et al.
9,486,070 B2 11/2016 Labrosse et al.
9,681,747 B1 6/2017 Pectol
9,795,322 B1 10/2017 Karunaratne et al.
9,905,106 B2 2/2018 Yang et al.
9,907,396 B1 3/2018 Labrosse et al.
9,971,340 B1 5/2018 Labrosse et al.
10,028,576 B1 7/2018 Yao
10,038,952 B2 7/2018 Labrosse et al.
10,085,562 B1 10/2018 Labrosse et al.
10,126,731 B2 11/2018 Lindstrom
10,130,169 B1 11/2018 Labrosse et al.
10,130,170 B1 11/2018 Labrosse et al.
10,133,261 B2 11/2018 Labrosse et al.
10,159,337 B2 12/2018 Abernethy et al.
10,206,498 B1 2/2019 Labrosse et al.
10,209,705 B1 2/2019 Labrosse et al.
10,271,643 B2 4/2019 Yamamoto et al.
10,381,808 B2 8/2019 Byrne et al.
10,390,620 B2 8/2019 Labrosse et al.
10,419,842 B2 9/2019 Labrosse et al.
10,631,640 B2 4/2020 Labrosse et al.
10,691,108 B1 6/2020 Labrosse et al.
10,719,064 B1 7/2020 Labrosse et al.
10,802,473 B2 * 10/2020 Labrosse .................. A47B 9/20
10,827,829 B1 11/2020 Labrosse et al.
10,863,825 B1 12/2020 Labrosse et al.
10,866,578 B1 12/2020 Labrosse et al.
10,869,118 B2 12/2020 Labrosse et al.
11,388,991 B1 7/2022 Poniatowski
2001/0013307 A1 8/2001 Stone
2001/0028308 A1 10/2001 De La Huerga
2002/0055419 A1 5/2002 Hinnebusch
2002/0145512 A1 10/2002 Sleichter, III et al.
2002/0153812 A1 10/2002 Hellwig et al.
2003/0122459 A1 7/2003 Huber et al.
2004/0010328 A1 1/2004 Carson et al.
2004/0014014 A1 1/2004 Hess
2004/0229729 A1 11/2004 Albert et al.
2004/0239161 A1 12/2004 Lee
2005/0058970 A1 3/2005 Perlman et al.
2005/0075213 A1 4/2005 Arick
2005/0113649 A1 5/2005 Bergantino
2005/0165626 A1 7/2005 Karpf
2005/0172311 A1 8/2005 Hjelt et al.
2005/0182653 A1 8/2005 Urban et al.
2005/0202934 A1 9/2005 Olrik et al.
2005/0209051 A1 9/2005 Santomassimo et al.
2005/0288154 A1 12/2005 Lee et al.
2006/0063980 A1 3/2006 Hwang et al.
2006/0081157 A1 4/2006 Gayhart et al.
2006/0089238 A1 4/2006 Huang et al.
2006/0205564 A1 9/2006 Peterson
2006/0241520 A1 10/2006 Robertson
2006/0250524 A1 11/2006 Roche
2006/0266791 A1 11/2006 Koch et al.
2007/0022918 A1 2/2007 Sweet et al.
2007/0074617 A1 4/2007 Vergo
2007/0135264 A1 6/2007 Rosenberg
2007/0146116 A1 6/2007 Kimbrell
2007/0179355 A1 8/2007 Rosen
2007/0200396 A1 8/2007 Baumann et al.
2007/0219059 A1 9/2007 Schwartz et al.
2007/0265138 A1 11/2007 Ashby
2008/0015088 A1 1/2008 Del Monaco
2008/0030317 A1 2/2008 Bryant
2008/0045384 A1 2/2008 Matsubara et al.
2008/0051256 A1 2/2008 Ashby et al.
2008/0055055 A1 3/2008 Powell et al.
2008/0077620 A1 3/2008 Gilley et al.
2008/0098525 A1 5/2008 Doleschal et al.
2008/0132383 A1 6/2008 Einav et al.
2008/0245279 A1 10/2008 Pan
2008/0255794 A1 10/2008 Levine
2008/0256445 A1 10/2008 Olch et al.
2008/0300110 A1 12/2008 Smith et al.
2008/0300914 A1 12/2008 Karkanias et al.
2008/0304365 A1 12/2008 Jarvis et al.
2008/0306351 A1 12/2008 Izumi
2009/0044332 A1 2/2009 Parsell et al.
2009/0076335 A1 3/2009 Schwarzberg et al.
2009/0078167 A1 3/2009 Ellegaard
2009/0132579 A1 5/2009 Kwang
2009/0133609 A1 5/2009 Nethken et al.
2009/0156363 A1 6/2009 Guidi et al.
2009/0195393 A1 8/2009 Tegeler
2009/0212974 A1 8/2009 Chiba et al.
2009/0229475 A1 9/2009 Bally et al.
2009/0270227 A1 10/2009 Ashby et al.
2009/0273441 A1 11/2009 Mukherjee
2009/0293773 A1 12/2009 Miller et al.
2010/0049008 A1 2/2010 Doherty et al.
2010/0073162 A1 3/2010 Johnson et al.
2010/0135502 A1 6/2010 Keady et al.
2010/0185398 A1 7/2010 Berns et al.
2010/0198374 A1 8/2010 Carson et al.
2010/0201201 A1 8/2010 Mobarhan et al.
2010/0205542 A1 8/2010 Walman
2010/0234184 A1 9/2010 Le Page et al.
2010/0323846 A1 12/2010 Komatsu et al.
2011/0015041 A1 1/2011 Shea
2011/0015495 A1 1/2011 Dothie et al.
2011/0033830 A1 2/2011 Cherian
2011/0054359 A1 3/2011 Sazonov et al.
2011/0080290 A1 4/2011 Baxi et al.
2011/0104649 A1 5/2011 Young et al.
2011/0120351 A1 5/2011 Shoenfeld
2011/0168064 A1 7/2011 Jahnsen et al.
2011/0182438 A1 7/2011 Koike et al.
2011/0184748 A1 7/2011 Fierro et al.
2011/0245979 A1 10/2011 Koch
2011/0275939 A1 11/2011 Walsh et al.
2011/0281248 A1 11/2011 Feenstra et al.
2011/0281687 A1 11/2011 Gilley et al.
2011/0296306 A1 12/2011 Oddsson et al.
2012/0015779 A1 1/2012 Powch et al.
2012/0051579 A1 3/2012 Cohen
2012/0116550 A1 5/2012 Hoffman et al.
2012/0173319 A1 7/2012 Ferrara
2012/0316661 A1 12/2012 Rahman et al.

(56) References Cited

U.S. PATENT DOCUMENTS

| | | | | |
|---|---|---|---|---|
| 2013/0002533 | A1 | 1/2013 | Burroughs et al. | |
| 2013/0012788 | A1 | 1/2013 | Horseman | |
| 2013/0086841 | A1 | 4/2013 | Luper et al. | |
| 2013/0116092 | A1 | 5/2013 | Martinez et al. | |
| 2013/0144470 | A1 | 6/2013 | Ricci | |
| 2013/0199419 | A1 | 8/2013 | Hjelm | |
| 2013/0199420 | A1 | 8/2013 | Hjelm | |
| 2013/0207889 | A1 | 8/2013 | Chang et al. | |
| 2013/0218309 | A1 | 8/2013 | Napolitano | |
| 2013/0307790 | A1 | 11/2013 | Konttori et al. | |
| 2013/0316316 | A1 | 11/2013 | Flavell et al. | |
| 2013/0331993 | A1 | 12/2013 | Detsch et al. | |
| 2014/0096706 | A1* | 4/2014 | Labrosse | G05B 19/048 108/21 |
| 2014/0109802 | A1 | 4/2014 | Dienes et al. | |
| 2014/0137773 | A1* | 5/2014 | Mandel | G06Q 10/109 108/50.11 |
| 2014/0156645 | A1 | 6/2014 | Brust et al. | |
| 2014/0245932 | A1 | 9/2014 | McKenzie, III et al. | |
| 2014/0249853 | A1 | 9/2014 | Proud et al. | |
| 2014/0270254 | A1 | 9/2014 | Oishi et al. | |
| 2015/0015399 | A1 | 1/2015 | Gleckler et al. | |
| 2015/0064671 | A1 | 3/2015 | Murville et al. | |
| 2015/0071453 | A1 | 3/2015 | Po et al. | |
| 2015/0142381 | A1 | 5/2015 | Fitzsimmons et al. | |
| 2015/0302150 | A1 | 10/2015 | Mazar et al. | |
| 2016/0051042 | A1 | 2/2016 | Koch | |
| 2016/0106205 | A1* | 4/2016 | Hall | A63B 24/0062 700/275 |
| 2016/0128467 | A1 | 5/2016 | Sigal et al. | |
| 2016/0213140 | A1 | 7/2016 | Koch | |
| 2016/0309889 | A1 | 10/2016 | Lin et al. | |
| 2017/0052517 | A1 | 2/2017 | Tsai et al. | |
| 2017/0135636 | A1 | 5/2017 | Park et al. | |
| 2017/0354244 | A1* | 12/2017 | Lee | A47B 21/02 |
| 2018/0184799 | A1* | 7/2018 | Lin | A47B 17/02 |
| 2019/0155253 | A1* | 5/2019 | Labrosse | G05B 19/416 |
| 2019/0328128 | A1 | 10/2019 | Namala | |
| 2021/0100353 | A1* | 4/2021 | Olesen | A47B 9/20 |
| 2022/0312952 | A1* | 10/2022 | Spreen | A47B 9/00 |
| 2023/0262910 | A1* | 8/2023 | Barkau | A47B 9/00 312/196 |

FOREIGN PATENT DOCUMENTS

| | | | |
|---|---|---|---|
| DE | 10260478 | A1 | 7/2004 |
| DE | 102006038558 | A1 | 4/2008 |
| DE | 102008044848 | A1 | 3/2010 |
| DE | 202014005160 | U1 | 7/2014 |
| EP | 1159989 | A1 | 12/2001 |
| EP | 1470766 | A1 | 10/2004 |
| GB | 2424084 | A | 9/2006 |
| JP | H11178798 | A | 7/1999 |
| JP | 2001289975 | A | 10/2001 |
| JP | 2005267491 | A | 9/2005 |
| SE | 516479 | C2 | 1/2002 |
| WO | 0219603 | A2 | 3/2002 |
| WO | 02062425 | A1 | 8/2002 |
| WO | 2005032363 | A1 | 4/2005 |
| WO | 2005074754 | A1 | 8/2005 |
| WO | 2006042415 | A1 | 4/2006 |
| WO | 2006042420 | A1 | 4/2006 |
| WO | 2006065679 | A2 | 6/2006 |
| WO | 2007099206 | A1 | 9/2007 |
| WO | 2008008729 | A2 | 1/2008 |
| WO | 2008050590 | A1 | 2/2008 |
| WO | 2008101085 | A2 | 8/2008 |
| WO | 2010019644 | A2 | 2/2010 |
| WO | 2010023414 | A1 | 3/2010 |
| WO | 2011133628 | A1 | 10/2011 |
| WO | 2012061438 | A2 | 5/2012 |
| WO | 2012108938 | A1 | 8/2012 |
| WO | 2013033788 | A1 | 3/2013 |

OTHER PUBLICATIONS

Benallal, et al., A Simple Algorithm for Object Location from a Single Image Without Camera Calibration, In International Conference on Computational Science and Its Applications, pp. 99-104. Springer Berlin Heidelberg, 2003.

Bendixen, et al., Pattern of Ventilation in Young Adults, Journal of Applied Physiology, 1964, 19(2):195-198.

BrianLaF, asp.net 4.0 TimePicker User Control, www.codeproject.com/articles/329011/asp-net-timepicker-user-control, Feb. 25, 2012, 5 pages.

Ejaz, Time Picker Ajax Extender Control, www.codeproject.com/articles/213311/time-picker-ajax-extender-control, Jun. 22, 2011, 8 pages.

Heddings, Stop Hitting Snooze: Change the Default Reminder Time for Outlook Appointments, www.howtogeek.com/howto/microsoft-office/stop-hitting-snooze-change-the-default-reminder-time-for-outlook-appointments, Apr. 25, 2008, 2 pages.

Hopkins Medicine, Vital Signs (Body Temperature, Pulse Rate, Respiration Rate, Blood Pressure). Source: Johns Hopkins Medicine Health Library, 2016, pp. 1-4.

Kriebel, How to Create a Two-Panel Column Chart in Tableau (And Save Lots of Time Compared to Excel), www.vizwiz.com/2012/02/how-to-create-two-panel-column-chart-in.html, 2012, 14 pages.

LINAK, Deskline Deskpower DB4/DL4 Systems User Manual, Copyright LINAK 2007.

LINAK, Deskline DL9/DB9/DL11 System User Manual, Copyright LINAK 2007.

LINAK, Deskline Controls/Handsets User Manual, Copyright LINAK 2017.

LINAK, DPG Desk Panels—A New Way to Adjust Your Office Desk, Product News, May 19, 2017.

Microsoft, Automatically Adjust the Start and Finish Dates for New Projects, Applies To: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-US&ad=US&fromAR=1, Copyright 2017 Microsoft.

mrexcel.com, Forum: How to Calculate Percentage of Total Used Time, www.mrexcel.com/forum/excel-qestions/192521-how-calculate-percentage-total-used-time.html., Post Date: Mar. 20, 2006, 4 pages.

Office Details, Inc., Height-AdjusTable Worksurfaces User Instructions, Copyright 2004 Office Details, Inc.

Paolo, Arduino Forum, Measuring Point To Point Distances With Accelerometer, http://forum.arduino.cc/index.php?action=printpage;topic=49902.0;images, Post Date: Jan. 26, 2011, 5 pages.

Process Dash, Using the Task & Schedule Tool, www.processdash.com/static/help/Topics/Planning/UsingTaskSchedule.html, Mar. 4, 2011.

Steelcase, Inc., Airtouch Height-Adjustable Tables, Brochure, Copyright 2015 Steelcase Inc.

Steelcase, Inc., Migration Height-Adjustable Desk, Brochure, Copyright 2015 Steelcase Inc.

Steelcase, Inc., Ology Height-Adjustable Desk, Brochure, Copyright 2016 Steelcase Inc.

Steelcase, Inc., Series 5 Sit-To-Stand Height-Adjustable Tables, Brochure, Copyright 2015 Steelcase Inc.

Steelcase, Inc., Series 7 Enhanced Sit-To-Stand Height-Adjustable Tables, Brochure, Copyright 2015 Steelcase Inc.

Sun Microsystems, Lights Out Management Module, https://docs.oracle.com/cd/E19585-01/819-0445-10/lights_out.html, Copyright 2004, Sun Microsystems, Inc.

Wideman, Issues Regarding Total Time and Stage 1 Time, http:/maxwideman.com/papers/resource/issues.html, 1994.

PCT International Search Report and Written Opinion, PCT/US2024/038164, Oct. 17, 2024, 11 pages.

* cited by examiner

SYSTEM AND METHOD FOR AUTOMATICALLY SETTING PREFERRED WORKSTATION HEIGHTS TO INCREASE HUMAN MOVEMENT AND PROMOTE WELLNESS

CROSS-REFERENCE TO RELATED APPLICATIONS

Not applicable.

BACKGROUND OF THE DISCLOSURE

The present invention generally relates to devices and systems for benefiting the health and efficiency of workers in a workplace, and more particularly, to height-adjustable support surfaces and other devices that encourage and facilitate health-benefiting movement by people that use workspace affordances.

It is well known that the human body is designed to move and that people from regular and frequent motion. The efficiency and health of our circulatory systems and our digestive systems benefits from regular movement throughout the day. If a person sits in a chair at a workstation for prolonged periods of time without stretching or standing, in many cases her head will tend to lean forward naturally to try to maintain core balance, causing a muscle tone imbalance between the front and rear sides of the body. This can result in spinal shrinkage and an increase of intra-disc pressure within the user's spine. This can also lead to muscle strain, muscle compression, nerve compression, tendon injury and ligament sprain at the shoulder, the neck, the upper limbs, and the back. This can further result in general musculoskeletal discomfort in the short term and more chronic upper and lower back pain and nerve-damage symptoms in the shoulder, the neck, arms and throughout the back (called: "repetitive strain injury") in the long term. Other health problems linked to a person regularly sitting for long periods of time include the blocking of the returning flow of venous blood causing blood to accumulate in the legs, in particular in the calves and ankles. Continued strain to such blood vessels will often lead to food edema, muscular discomfort in the legs, and varicosity.

Unfortunately for her health, a typical office worker spends most of her day working in an environment that facilitates very little body movement. Sitting in a chair at a workstation for hours at a time is not uncommon and quite often the only movement many workers experience while at work stems from rapid, albeit slight movement of their fingers, hands and wrists as they operate their computers and phones while "comfortably" seated. A typical worker will not only sit most of her day while at work, but also sits during their commute between work and home and when eating lunch. Thus, many office workers are in a seated position for 10 or more hours each day, and often for long uninterrupted periods of time.

One way this health concern has been addressed in the office furniture industry has been to provide a height adjustable desk (HAD), also known as a "sit-stand" workstation, to each person, where a leg structure that supports a desktop or worktop is extendable so that the worktop height can be adjusted between levels suitable to support a worker in either a sitting or a standing position. In some cases HAD height is manually adjustable to meet user preferences. In other cases, powered HAD assemblies include drive mechanisms (e.g., gears and the like) and one or more motors to control the drive mechanisms to change worktop height to satisfy user preferences.

Early powered HADs included simple interfaces having, for instance, up and down buttons that were selectable to raise and lower the HAD worktop, respectively. For instance, when a user wanted to raise a worktop from a sitting to a standing height, the user pressed the up button and held that button persistently until the worktop reached a desired standing height. Then, the user released the up button and the worktop halted at the current height, the user's desired standing height. If the user waited too long to release the up button and the worktop moved up above the user's desired standing height, the user would then press the down button to lower the worktop until, again, the worktop stopped at the desired standing height. While simple, this hunting process for a desired standing or sitting height was a burden as it required the user to persistently hold a button and often required several adjustments up and down while hunting for the user preferred height.

Recognizing that specific office workers tend to have persistent preferred standing and sitting HAD heights (e.g., user Mary Monday may persistently prefer a 26 inch sitting height and a 41 inch standing height), an "automatic" height adjustment feature has been added to some HADs whereby, once a user sets her preferred standing and sitting heights, to move the worktop to the preferred standing height, the user simply has to activate an "automatic control" input (e.g., press a button) to cause the controller and motor to move the worktop to the preferred standing height without requiring persistent button pressing/activation and without the possibility of the worktop shooting past the preferred height and requiring a height hunting process as described above). Here, for instance, assuming that a worktop is currently at a 26-inch preferred sitting height and a user's set preferred standing height is 41 inches, when the user presses an automatic control button to change to the standing height, the controller and motor automatically drive the worktop upward to the 41-inch height where the worktop stops. To move the worktop to the user's set preferred sitting height, the user simply presses an automatic control button to move the worktop to the preferring sitting height without requiring persistent activation of an input device and without the possibility of the worktop lowering to a height below the preferred sitting height and requiring a reverse hunting action to move to top to the preferred sitting height.

Some HAD interfaces have been developed that include dedicated buttons, displays, and other features used to set and store preferred user standing and sitting heights. Unfortunately, these dedicated hardware type interfaces for setting height preferences increase HAD assembly costs generally. In addition, more buttons and displays and other interface features often make interfaces look cluttered and unappealing. Furthermore, these multicomponent hardware type systems are often not intuitive to use as they require selection of different preferences as well as values associated with each preference, and confirmation activities to confirm that height values are to be stored.

Other HADs have been designed so that at least some interface components that already exist for height adjustment (e.g., up and down buttons) can be used in a different way during a commissioning process to specify user standing and sitting height preferences. Here, because components optimized for height adjustment are used in a second way to set preferences for which the components have not been optimized, the preference setting process is even less intuitive and often more complex (e.g., requiring a specific sequence of consecutive button activations) and difficult to remember when not regularly employed.

In cases where a user's standing and sitting height preferences remain the same over months or even years and a specific HAD is uniquely occupied by the user for months or even years (e.g., in an assigned office or assigned personal workspace), height preferences need only be set once at the beginning of that period and then the preference setting process can be forgotten. In this case, the burden associated with a non-intuitive and/or multistep preference setting process is insignificant.

However, in cases where a user's preferred standing and sitting heights change more routinely, non-intuitive and/or complex multistep preference changing processes can be particularly challenging. For instance, a user may prefer different standing heights on different days of the week depending on energy level. As another instance, a user may prefer different morning sitting heights and afternoon sitting heights some days, based on what the user ate for breakfast and lunch or on other instantaneous physiological conditions.

As another instance, many offices have decided to minimize office facility costs by allowing and/or encouraging employees to work remotely at least part time and having employees share workspaces including HADs in a "hoteling" fashion. Thus, for example, Mary Monday may use a first HAD on Monday and Stacy Pink may use the first HAD on Tuesday while Al Green uses the first HAD on Wednesday. Here, for each of Mary, Stacy, and Al to take advantage of the automatic height adjustment features of the HAD, each one has to set their height preferences at the beginning of each period of use. Here, again, complex and or/non-intuitive preference setting processes operate to impede optimized use of automatic HAD height adjustment features.

In situations where height preference setting processes required to use automatic preferred height adjustment features are not easy, many users simply forego using the automatic preferred height adjustment features. For instance, a user may forego using an automatic height adjustment mechanism if she needs to locate and retrieve a user's manual to remember how to set preferences. In other cases, where a prior user set her standing and sitting height preferences, a next user not knowing how to set his own preferences, may simply opt to continue to use the prior user's settings even when not optimized for the next user. In addition to being a disappointment to the next user, over time, improper office affordance settings that are not optimized for the next user can cause premature fatigue, stress, or even injury in some cases. In cases where a user decides to seek instructions on how to set preferences, locating those instructions is often a burden and non-intuitive processes can cause user frustration.

While there are others, one important object of the disclosed HAD systems is to provide a useful, affordable power-assisted HAD or workstation that facilitates a simple method for setting user-specific worktop height preferences and physical configurations of shared workspaces to accommodate user preferences.

SUMMARY OF THE DISCLOSURE

The disclosure includes a system for adjusting a position of an article of furniture, the system comprising, an article of furniture including at least a first element that is moveable with respect to a second element, the at least a first element being movable to positions within a range of motion with respect to the second element, the range of motion including first and second position ranges, a memory storing a first position within the first position range for the first element and a second position within the second position range for the first element, a user interface for receiving automatic position change commands and manual position change commands and a processor programmed to perform the steps of, with the first element in a position other than the first position, (a) upon receiving an automatic position change command via the user interface, changing the position of the first element to the first position, (b) upon receiving a manual position change command via the user interface to move the first element to a third position that is different than the first position and the second position, (i) changing the position of the first element to the third position, (ii) determining that the third position is in one of the first position range or the second position range, (iii) when the third position is in the first position range, storing the third position as the first position, (iv) when the third position is in the second position range, storing the third position as the second position and (c) repeating steps (a) and (b).

In some embodiments the first position range does not overlap the second position range. In some embodiments the first position range includes a boundary position and the second position range extends up to the boundary position. In some embodiments the step of storing the third position as the first position includes tracking duration of time that the first element is in the third position within the first position range and, when the duration of time exceeds a threshold duration, storing the third position as the first position and the step of storing the third position as the second position includes tracking duration of time that the first element is in the third position within the second position range and, when the duration of time exceeds a threshold duration, storing the third position as the second position.

In some embodiments the interface includes first and second independently selectable activation devices, the step of changing the first element to the first position including, upon receiving an automatic position change command via the first activation device, changing the position of the first element to the first position, the processor further programmed to perform the steps of, with the first element in a position other than the second position, upon receiving an automatic position change command via the second activation device, changing the position of the first element to the second position.

In some cases the range of motion extends between first and second limit positions and wherein the first independently selectable activation device is selectable for moving the first element along a first trajectory that extends from the first limit position toward the second limit position and the second independently selectable activation device is selectable for moving the first element along a second trajectory that extends from the second limit position toward the first limit position. In some cases the first activation device is also selectable to manually move the first element along the first trajectory to a third position, and the second activation device is also selectable used to manually move the first element along the second trajectory to a third position. In some cases a manual position change command is input by persistently selecting the first activation device to move the first element along the first trajectory until the first element is in the third position or persistently selecting the second activation device to move the first element along the second trajectory until the first element is in the third position.

In some embodiments the automatic position change command is input by a tap and release of the first activation device to move the first element along the first trajectory until the first element is in the first position or by a tap and release of the second activation device to move the first element along the second trajectory until the first element is in the second position. In some cases each tap and release activation includes a double tap and release activation.

In some embodiments the range of motion extends between first and second limit positions, the first position range extends from the first limit position to a first boundary position, the second position range extends from a second boundary position to the second limit position, and wherein there are a plurality of first element positions that are not in either of the first or second position ranges and that are between the first and second boundary positions.

In some cases the article of furniture includes a height adjustable table wherein the second element includes a support structure and the first element includes a worktop member and wherein the first position range includes a standing range and the second position range includes a sitting range. In some cases the interface includes first and second independently selectable activation devices, the step of changing the first element to the first position including, upon receiving an automatic position change command via the first activation device, changing the position of the first element to the first position, the processor further programmed to perform the steps of, with the first element in a position other than the second position, upon receiving an automatic position change command via the second activation device, changing the position of the first element to the second position, and wherein the range of motion extends between first and second limit positions and wherein the first activation device is selectable for moving the first element along a first trajectory that extends from the first limit position toward the second limit position and the second activation device is selectable for moving the first element along a second trajectory that extends from the second limit position toward the first limit position. In some cases the automatic position change command to move the worktop to the first position is input by a tap and release of the first activation device wherein the release occurs prior to the worktop reaching the first position, and the automatic position change command to move the worktop to the second position is input by a tap and release of the second activation device wherein the release occurs prior to the worktop reaching the second position. In some embodiments each tap and release activation includes a double tap and release activation. In some embodiments a manual position change to move the worktop along the first trajectory includes persistently activating the first activation device until the third position is reached and wherein a manual position change to move the worktop along the second trajectory includes persistently activating the first activation device until the third position is reached. In some cases the interface includes a lever mounted to the worktop wherein the lever includes oppositely facing upper and lower surfaces, the first activation device including the undersurface of the lever and the second activation device including a top surface of the lever. In some cases the interface includes a display screen and wherein the first activation device includes a first virtual icon presented on the display screen and the second activation device includes a second virtual icon presented on the display screen.

In some embodiments the step of storing the third position as the first position includes tracking duration of time that the first element is in the third position within the first position range and, when the duration of time exceeds a threshold duration, storing the third position as the first position and the step of storing the third position as the second position includes tracking duration of time that the first element is in the third position within the second position range and, when the duration of time exceeds a threshold duration, storing the third position as the second position.

Some embodiments include a system for adjusting a position of an article of furniture, the system comprising, an article of furniture including at least a first element that is moveable with respect to a second element, the at least a first element being movable to positions within a range of motion with respect to the second element, the range of motion extending between first and second limit positions and including first and second position ranges, a memory storing a first position within the first position range for the first element and a second position within the second position range for the first element, a user interface including first and second independently selectable activation devices, the first activation device selectable to move the first element along a first trajectory that extends from the first limit position toward the second limit position and the second activation device selectable for moving the first element along a second trajectory that extends from the second limit position toward the first limit position and a processor programmed to perform the steps of, (a) with the first element in a position other than the first position, upon receiving an automatic position change command via the first activation device, changing the position of the first element to the first position, (b) with the first element in a position other than the second position, upon receiving an automatic position change command via the second activation device, changing the position of the first element to the second position, (c) upon receiving a manual position change command via either one of the first activation element and the second activation element to move the first element to a third position that is different than the first position and the second position, (i) changing the position of the first element to the third position, (ii) determining that the third position is in one of the first position range or the second position range, (iii) when the third position is in the first position range, storing the third position as the first position, (iv) when the third position is in the second position range, storing the third position as the second position, and (d) repeating steps (a) through (c).

In some embodiments the article of furniture includes a height adjustable table assembly and wherein the first position range is a standing height range and the second position range is a sitting height range.

Still other embodiments include a system for adjusting a position of an article of furniture, the system comprising an article of furniture including at least a first element that is moveable with respect to a second element, the at least a first element being movable to positions within a range of motion with respect to the second element, the range of motion including first through Nth position ranges, a memory storing first through Nth positions of the first element with respect to the second element within the first through Nth position ranged, respectively, a user interface for receiving automatic position change commands and manual position change commands, and a processor programmed to perform the steps of, with the first element in an initial position which is one of the first through Nth positions, (a) upon receiving an automatic position change command via the user interface, changing the position of the first element to one of the first through Nth positions other than the initial position, (b) upon receiving a manual position change command via the user interface to move the first element to a new position that is different than any of the first through Nth positions, (i)

changing the position of the first element to the new position, (ii) identifying one of the first through Nth position ranges that includes the new position as a selected position range; and (iii) replacing the stored position associated with the selected position range with the new position in the memory and (c) repeating steps (a) and (b).

While this disclosure is described primarily in the context of a HAD, it should be recognized that the disclosed system can be used to simplify setting user preferences for other workplace affordances, especially in cases where a user routinely prefers to alternate between first and second different preferred affordance settings.

BRIEF DESCRIPTION OF THE SEVERAL VIEWS OF THE DRAWINGS

The disclosure can be more fully understood from the following detailed description taken in conjunction with the accompanying drawings, in which.

DETAILED DESCRIPTION OF THE DISCLOSURE

Figure 1:
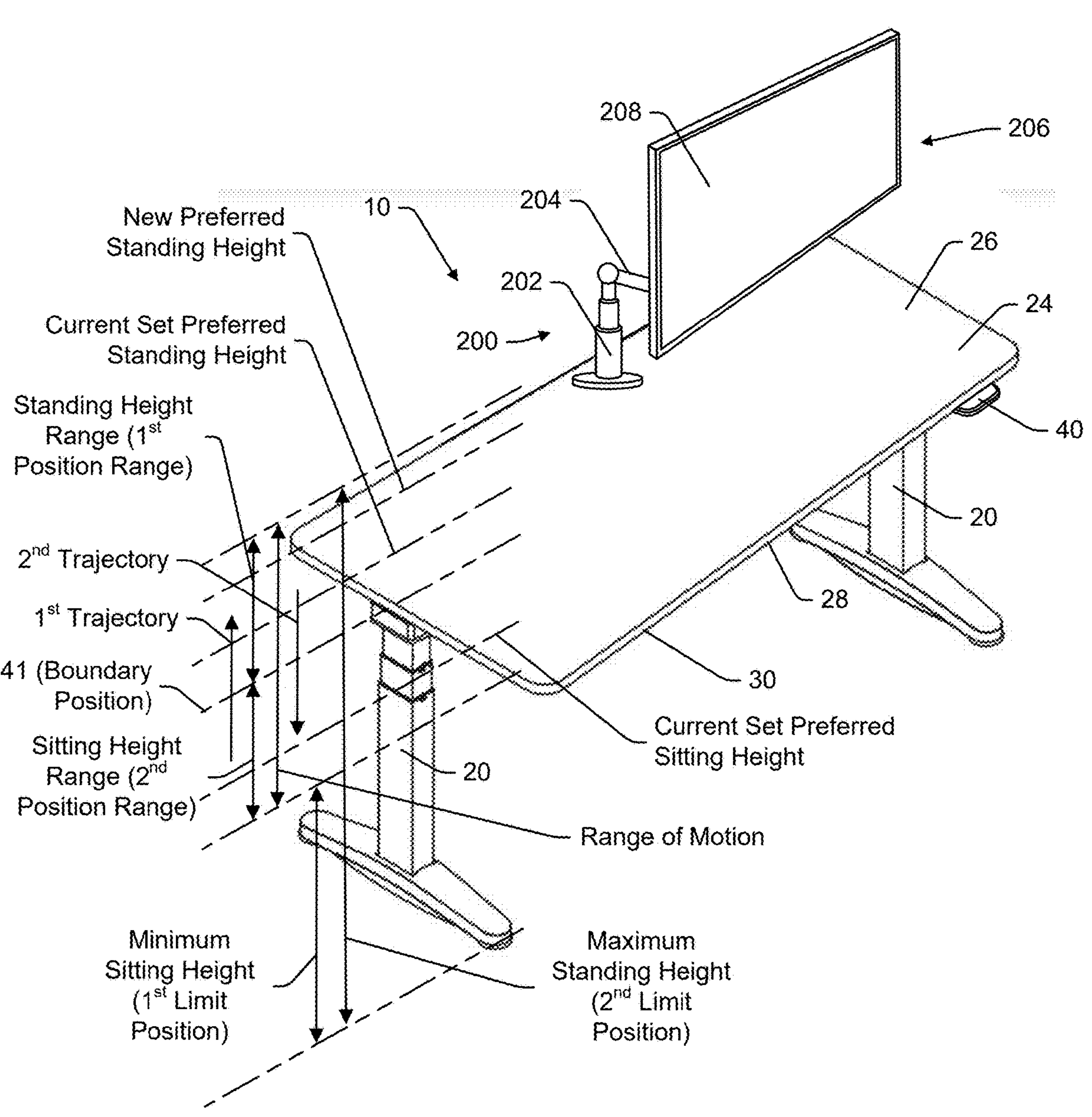
FIG. 1 is a top angled perspective view of an exemplary sit-stand workstation that is consistent with at least some aspects of the present disclosure including a frame structure having two vertically displaceable legs each of which is attached to a base at a lower end and attached to a common support at an upper end, and a control unit, a worktop shown in a lowered position.

Height adjustable desks (HADs), workstations and other furniture (e.g., office furniture, hospital furniture, domestic furniture, hotel furniture, etc.) can be adjustable to accommodate user characteristics and preferences. Many articles of furniture or workplace affordances (e.g., HADs, task chairs, privacy screens, monitor support arms/structures, etc.) are equipped with control systems and drive mechanisms to adjust positions of furniture/affordance components in accordance with commands received from a user via an interface (e.g., through buttons, levers, control systems, control panels, etc.). In some examples of the present disclosure, control systems store user preferences and move furniture/affordance components/elements in accordance with those preferences. User preferences may include, among others, positions of a first furniture element with respect to a second furniture element (e.g., a vertical height, an angular rotation, a tilt angle, and the like). In addition, in at least some embodiments, preferences may be related to how quickly physical orientation changes are made. For instance, in the case of a height adjustable workstation, a first workstation user may prefer that a worktop move rapidly between sitting and standing positions while a second user may prefer a slower pace of movement.

As an example, a worker may use a height adjustable workstation, as described above, that includes a control system and a motor and drive for raising and lowering a worktop of the workstation. A user can set a preferred sitting height for the worktop, at which height the worktop is at a comfortable height for the user when the user is seated. The user can further specify a preferred standing height for the worktop, at which height the worktop is at a comfortable height for the user when the user is standing.

The worktop can be alternately moved from the preferred sitting height to the preferred standing height based on commands received from the user, as when a user presses a button or activates some other control element or activation device to either raise or lower the worktop automatically (e.g., without requiring persistent holding of the activation device). Additionally or alternatively, a control system of the workstation can raise and/or lower the worktop to preferred and stored set heights at scheduled time intervals, without requiring input from the user (e.g., at a timed out trigger time). In some cases, a HAD can be equipped with visual, audio, and/or tactile/haptic (e.g., vibration, slight and smooth up and down movements, etc.) indicators to remind a user to raise or lower the worktop at specific times.

Consistent with at least some aspects of the present disclosure, in the context of a height adjustable workstation or desk assembly, a simplified process is implemented enabling a desk user to intuitively and quickly set user preferences for standing and sitting heights so that, once set, automatic height adjustment between those preferred heights can be easily facilitated. To this end, referring to FIG. 1, an exemplary height adjustable desk (HAD) or workstation 10 is illustrated that includes first and second telescoping leg subassemblies 20 (hereafter "legs 20") and a worktop member (hereafter "worktop") 24 mounted at upper ends of the legs 20. The legs 20 are controllable to extend and contract so that worktop 24 can be moved up and down to different worktop heights within a range of motion extending between first and second limit positions corresponding to a minimum sitting height and maximum standing height, respectively.

In at least some embodiments of the present disclosure, a workstation memory device stores a sitting height position range that extends from the first or lower limit position to an intermediate boundary position and a standing height position range that extends from the second or upper limit position to and includes the intermediate boundary position. In at least some embodiments, the memory device also stores a current set preferred standing height (e.g., a first position) and a current set preferred sitting height (e.g., a second position) wherein the preferred standing height is a most recently set preferred standing height within the standing height range and the preferred sitting height is a most recently set preferred sitting height within the sitting height range.

An automatic move to the current preferred standing height can be facilitated by inputting a command via an interface to automatically move from a current height to the set standing height and an automatic move to the current preferred sitting height is similarly facilitated by simply inputting a command via the interface to automatically move from a current height to the set preferred sitting height. Any perceivable signal may constitute an auto-move command including but not limited to a single touch or activation or tap and release action of a button/activation device, a double tap and release action of a button, a gesture like a sensed swipe upward or downward, selection of a button dedicated to an auto-move command, etc.

To change the set/stored preferred standing height, a user uses an interface activation device to manually move worktop 24 to a third height that is not the currently set standing height and that is within the standing height range (e.g., within a first position range). For instance, assume that current set/stored preferred standing and sitting heights are as labelled in FIG. 1, that worktop 24 is at the current preferred sitting height, that a current desk user prefers a new standing height as labelled, the user wants to move the worktop to the new preferred standing height, and wants to set the new preferred standing height as the stored preferred standing height for subsequent automatic height adjustment while the user is using workstation 10. Here, to store the new preferred height as the set preferred standing height for subsequent automatic height adjustments, the user simply uses the workstation interface to manually move worktop 24 to the new preferred standing height within the standing height range.

The manual height adjustment command may be generated via many different activation device types including dedicated up and down manual adjustment devices or, in some cases, the same activation devices used to generate auto-move commands, albeit where the manual command is generated by a different type of activation of the device than the activation associated with the auto-move command. For instance, persistent activation of an up button may generate a manual upward height adjustment command while a double tap and release of the same up button may generate an auto-move upward command.

A system processor is programmed to recognize when worktop 24 has been moved and stopped at a third height other than one of the currently stored preferred standing height or preferred sitting height, identify which of the standing height position range or sitting height position range includes the third position, to store the third position as the preferred standing height position when the third position is in the standing height position range, and to store the third position as the preferred sitting height position when the third position is in the sitting height position range. Thus, in the present example, when worktop is moved to and stopped at the new preferred standing height as labelled in FIG. 1, the processor recognizes that worktop 24 is in the standing height position range and replaces the current set preferred standing height with the new preferred standing height (e.g., the new preferred standing height is stored as the current set preferred standing height).

As an alternative, referring again to FIG. 1, with worktop 24 at the current set preferred sitting height, the user may use the interface to enter a command to automatically move the worktop to the current set preferred standing height. Then, once worktop 24 is positioned at the current set preferred standing height, the user may recognize that the user prefers the higher new preferred standing height as labelled in FIG. 1. The user uses the interface to manually drive worktop 24 to the new preferred standing height and, once top 24 is halted at the new height (e.g., a third height that is not one of the set preferred heights), the processor, again, recognize that the new height is in the standing height range and stores the new height in the memory as the set preferred standing height for subsequent automatic height changes. Thus, with worktop 24 at a current set preferred standing height, any worktop height adjustment within the standing height range causes the processor to store the new worktop height as the current set preferred standing height.

The system operates in a similar fashion to intuitively change the stored/set preferred sitting height. In this regard, anytime a user uses the interface to manually move worktop 24 to a third height within the sitting height range that is different than the current set preferred sitting height, the processor is programmed to store the new height as the current set preferred sitting height.

Thus, in at least some embodiments, any manual worktop height adjustment to a third height that is not one of the stored/set preferred standing or sitting heights, is identified as a new preferred height and stored as such for subsequent use during an auto-move height adjustment. Once preferred standing and preferred sitting heights are stored, the worktop is always at one or the other of the preferred standing height or preferred sitting height. When a user enters an auto-move command while the worktop is at a height in one of the position ranges, the processor drives the worktop to the preferred height in the other position range.

In some cases, the processor is programmed to require that a worktop remain at a manually adjusted height for at least a threshold duration of time prior to storing the height as one of the preferred heights. For instance, when a user manually moves worktop 24 to the new preferred standing height as illustrated in FIG. 1, worktop 24 may have to remain at the new preferred standing height for at least 4 seconds prior to the processor storing the new height as the current set preferred standing height.

Referring again to FIG. 1, planar worktop 24 includes a worktop surface or upper surface 26 and an underside or undersurface 28. Each telescoping leg 20 is preferably of the type that includes two or more vertically telescoping tubular sections and is designed to selectively contract and extend vertically between a lowest height (i.e., a minimum sitting height), preferably about 22 inches, and a highest or standing height (i.e., a maximum standing height), preferably about 48 inches. The telescoping legs 20 can be adjusted to move the work surface 26 to the minimum sitting height (e.g., as illustrated in FIG. 1), the maximum standing height, or any height in between the maximum standing height and the minimum sitting height. A first or upward trajectory (labeled) is in the direction of movement from the minimum sitting height toward the maximum standing height and a second or downward trajectory (labeled) is in the direction of movement from the maximum standing height toward the minimum sitting height.

In some cases, a height adjustable workstation can have a different configuration than illustrated. For example, the present disclosure is applicable to height-adjustable workstations having only one leg, or three or more legs. While legs of a height adjustable workstation can preferably be telescoping (e.g., as illustrated in FIG. 1), station 10 may instead include differently configured legs capable of height adjustment such as, for instance, scissoring legs. In addition, in some embodiments the assembly 10 may not include any legs and instead may support worktop 24 for height adjustment via a different type of under support structure. For instance, in some cases worktop 24 may be mounted to one or more carriages that ride along vertical wall mounted tracks between different height positions along a range of motion.

Figure 2:
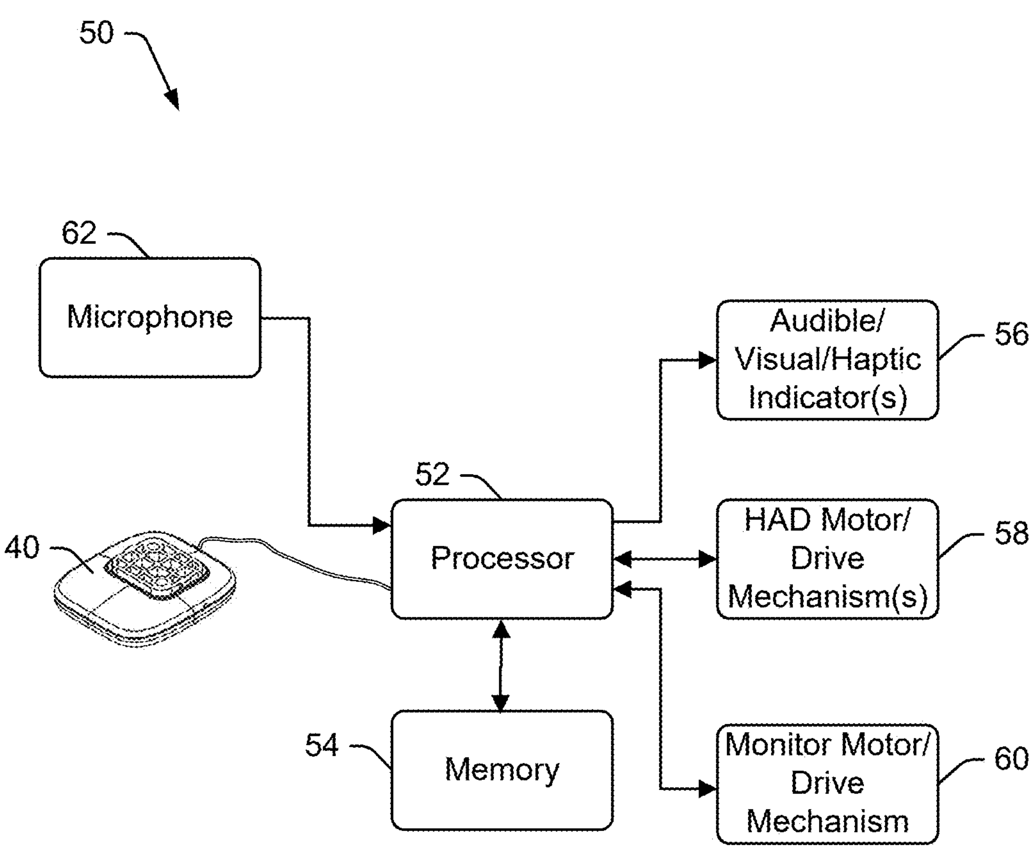
FIG. 2 is a system schematic showing details of a control system and peripheral sensors and devices, according to some aspects of the disclosure.
Figure 3:
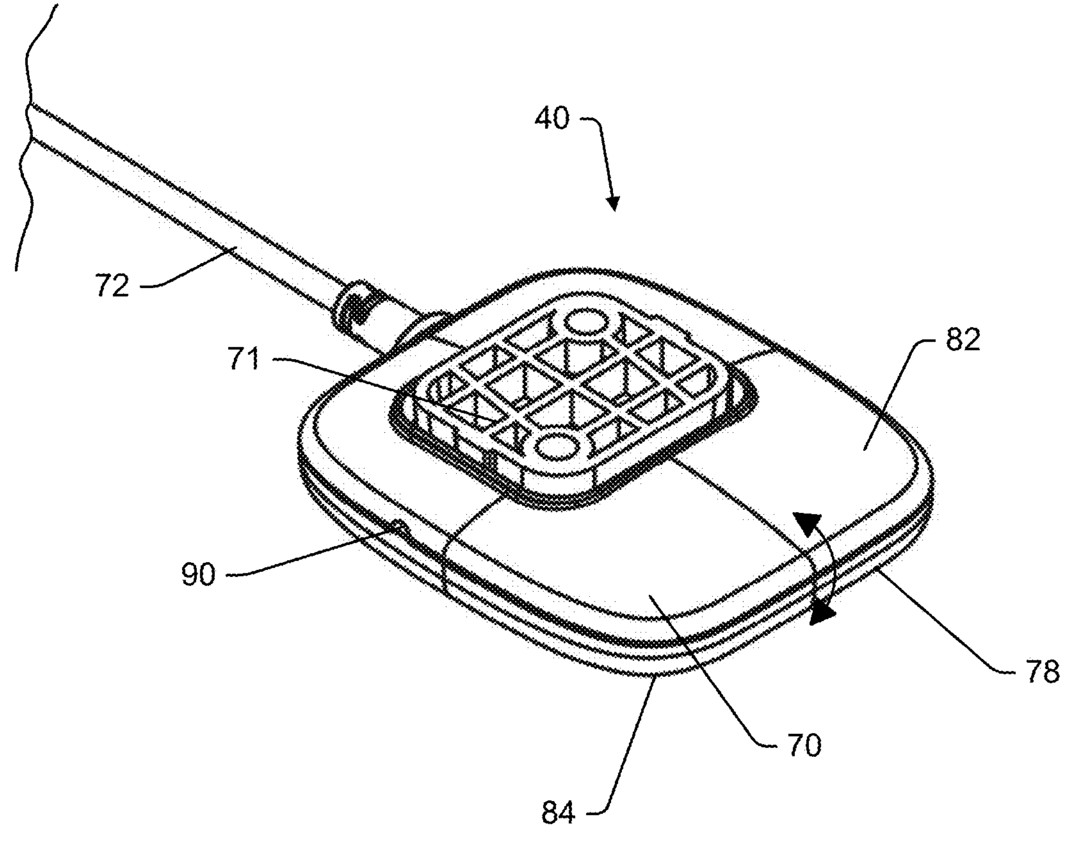
FIG. 3 is a top angled perspective view of an exemplary control interface for the workstation of FIG. 1.

Referring still to FIG. 1 and to FIG. 2, at least one, but preferably both telescoping legs 20 include motors/drive mechanisms (e.g., drive mechanism 58 shown in FIG. 2). The drive mechanism is preferably located within the telescoping legs 20 or adjacent thereto near the lower surface of worktop 24 and can be electronically and precisely driven to control the exact magnitude of linear displacement (extension or retraction), and therefore the exact height of worktop 24, as measured between an ambient floor on which workstation 10 is supported and top surface 26.

The drive mechanism preferably includes an electric motor (not shown) connected to a lead screw (not shown) wherein the lead screw engages a threaded follower. The follower can be mechanically secured to a rigid portion of the pedestal structure so that as the motor rotates the lead screw, the follower is forced along the lead screw and in turn, causes linear displacement of the upper portions of telescoping legs 20 and, by extension, worktop 24.

Although the above arrangement is preferred, other drive mechanisms may be employed to raise and lower the work surface 26, as those of ordinary skill in the art are well aware, including a system of pulleys and cables, toothed belts, rack and pinion arrangements, and/or appropriate bar linkages (e.g., four-bar or scissor type linkages). Each of these systems may be used to effectively mechanically linearly displace each upper portions of the telescoping legs 20, as instructed. Instead of an electrical drive motor, the linear drive mechanism for linearly displacing the pedestals may alternatively be derived from an appropriate pneumatic or hydraulic drive system or a magnetic linear motor, as understood by those skilled in the art.

Referring still to FIG. 2, workstation 10 also includes processor 52 and memory 54 and may include a user input interface 40 (see also FIG. 1) and output devices or indicators 56. Processor 52 is linked to interface 40, memory 54, indicators 56 and drive 58 as shown.

Referring still to FIGS. 1 and 2, workstation 10 includes an interface having at least a first or more user controls or activation devices 40 that can allow a user to adjust the height of the height-adjustable table. Exemplary interface 40 is mounted to the underside 28 of worktop 24. This configuration results in maximum area of work surface 26 usable by a workstation user. Alternative arrangements for interfaces of a height-adjustable workstation are described hereafter.

Figures 4A, 4B, 4C:
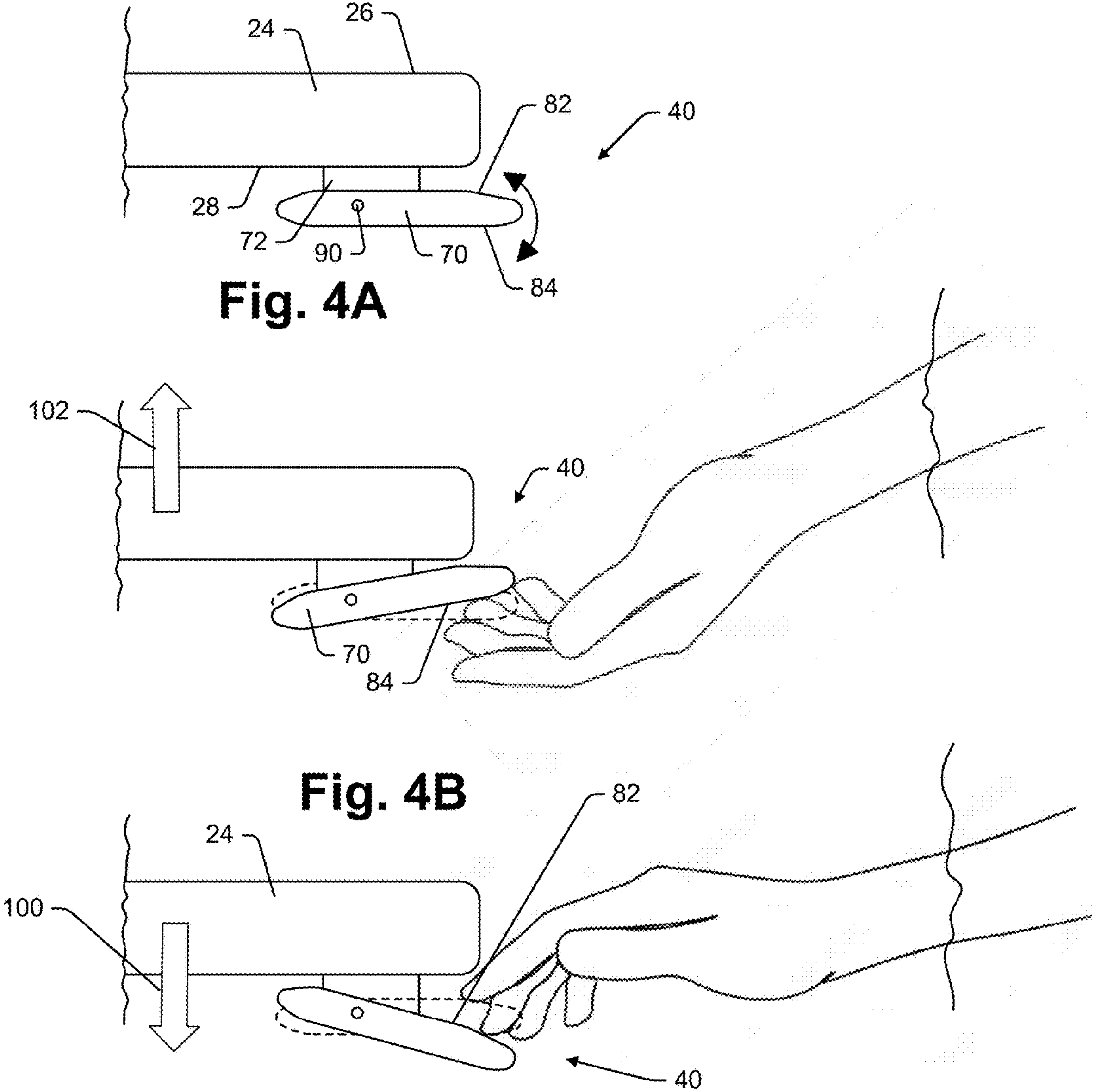
FIGS. 4A-4C are schematic side elevation views of the interface of FIG. 3 for use with a workstation according to some aspects of the present disclosure.

Referring also to FIGS. 3 and 4A through 4C, interface 40 includes a fixed portion 71 and a pivoting paddle member 70 mounted for rotation or pivoting about a horizontal fulcrum point 90 for movement between at least first and second different positions as shown best in FIGS. 4B and 4C. In the illustrated embodiment fixed portion 71 can include features for mounting interface 40 to the workstation 10 (e.g., at the underside 28 of the worktop 24). The interface 40 can be mounted using known fasteners (e.g., screws, bolts, nails) mechanical couplings, or adhesives. The mounting surface 70 can be hidden from view when interface 40 is mounted to the workstation 10. As shown, the interface can include a wire 72 extending from the interface which can operatively connect interface 40 to processor 52 (e.g., as shown in FIG. 2). When the interface is installed, wire 72 extends along underside 28.

In at least some cases paddle member 70 is spring biased into a central position (FIG. 4A) between the first and second positions so that when released, the spring forces the paddle into the central position. Fixed portion 71 is mounted to undersurface 28 of worktop 24 adjacent a front edge of member 24 and a distal end of paddle member 70 extends forward past the front edge of member 24 to be accessed by a user. The distal end of paddle member 70 includes an upper surface 82 and a lower surface 84. In this embodiment, upper surface 82 operates as a first activation device for generating control signals to move worktop 24 downward and lower surface 84 operates as a second activation device for generating control signals to move worktop upward.

Referring still to FIGS. 1 through 4C, interface 40 can be manipulated to move worktop 24 to any position within the range of motion shown in FIG. 1. In at least some cases, to move worktop 24 upward, a user simply presses upward on lower surface 84 of paddle member 70 so that member 70 pivots upward which generates a command signal to processor 52 and in response processor 52 controls the leg drive mechanism to raise worktop 24 as shown at 102 in FIG. 4B. Here, while paddle member 70 is persistently activated or pivoted into the upper position as illustrated in FIG. 4B, the drive continues to raise worktop 24 in the direction of the first trajectory as illustrated in FIG. 1 (albeit limited by the maximum standing height position). If the user releases member 70 prior to worktop 24 reaching the maximum standing height position, the drive mechanism is halted at the position at which member 70 is released. Worktop movement upward is restricted to the maximum height as shown in FIG. 1.

In at least some cases, to move worktop 24 downward, a user simply presses downward on upper surface 82 of paddle member 70 so that member 70 pivots downward which generates a command signal to the workstation processor 52 and in response the processor controls the leg drive mechanism to lower worktop 24 as shown at 102 in FIG. 4C. Here, while paddle member 70 is persistently activated or pivoted into the lower position as illustrated in FIG. 4C, the drive continued to lower worktop 24 in the direction of the second trajectory as illustrated in FIG. 1. If the user releases member 70 prior to worktop 24 reaching the minimum sitting position, the drive mechanism is halted at the position at which member 70 is released. Worktop movement downward is restricted to the minimum height as shown in FIG. 1.

In some cases, pre-set standing and sitting heights may be programmed into memory 54 and processor 52 may be programmed to halt worktop movement at the pre-set heights at least temporarily during manual worktop movement when worktop 24 reaches those heights. For instance, while a user is pressing upward on lower surface 84 in FIG. 4B, worktop 24 may be driven upward until a pre-set standing height is reached where the pre-set height is lower than the maximum standing height. Here, processor 52 may halt worktop movement at the pre-set standing height once reached. When worktop 24 is halted, in some cases, if force is persistently applied to undersurface 84, after a short duration (e.g., ½ second), the worktop may again be driven upward toward the maximum height until member 70 is released. In other embodiments, once the worktop halts at a pre-set standing height, to raise the worktop further, a user must release member 70 and repress upward again on surface 84.

In some cases, automatic worktop movement is contemplated. Here, automatic worktop movement means that once a non-persistent signal to change worktop height is input to processor 52, the processor drives worktop 24 toward a pre-set position automatically and independent of any further input by the user and the worktop is automatically halted once the pre-set position is reached. For instance, in some cases a single and rapid tap and release activation via lower surface 84 in FIG. 4B may generate an automatic upward command causing processor 52 to move worktop 24 upward to a pre-set and stored standing height. Similarly, in some cases a single and rapid tap and release activation via upper surface 82 in FIG. 4C may generate an automatic downward command causing processor 52 to move worktop 24 downward to a pre-set and stored sitting height. In particularly advantageous embodiments, a double rapid tap and release activation on surface 84 is required to automatically move to the standing height and a double rapid tap and release activation on surface 82 is required to automatically move to the sitting height.

Referring again to FIG. 2, processor 52 can be any suitable hardware processor or combination of processors, such as a central processing unit (CPU), a graphics processing unit (GPU), an application specific integrated circuit (ASIC), a field-programmable gate array (FPGA), etc. The processor can be operatively connected to a memory 54, which can have stored thereon instructions for implementing processes of the control system 50. In some embodiments, the memory 54 can include any suitable storage device or devices that can be used to store instructions, values, etc., that can be used, for example, by processor 52 to implement algorithms of the control system 50. Memory 54 can include any suitable volatile memory, non-volatile memory, storage, or any suitable combination thereof. For example, memory 54 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 54 can have encoded thereon a computer program for controlling operation of the control system 50. For example, in such embodiments, processor 52 can execute at least a portion of the computer program to receive inputs and implement processes in response. For example, the memory 54 can have stored thereon a sitting and standing height, as described with respect to FIG. 1. The memory can include instructions for implementing the process shown in FIG. 5, for example, and can provide instructions to processor 52 which can control output devices of the control system 50 to implement the processes.

Interface 40 is operatively connected to processor 52 and can provide one or more signals to processor 52, usable to control an operation of the height-adjustable workstation 10. For example, a first signal can be received by the processor from the interface 40 when the user performs a press and persistent hold operation on a control element (e.g., first activation device) of the interface, and processor 52 can continuously operate a drive mechanism (e.g., one or both of drive mechanisms 58, 60, as described below) while the signal is received. Interface 40 can provide a second (e.g., a different) signal in response to a double tap of a control element or second activation device of the interface 40, and in response, processor 52 can operate the drive mechanisms 58 to automatically move elements of the workstation 10 to a standing or sitting position without requiring the user to persistently hold the activation device in an activated position. In some embodiments, a processor can receive other control signals and produce a response at outputs of the control system in response, in accordance with instructions stored on in the workstation memory.

In some cases, processor 52 is operatively coupled to output devices to provide one or more alerts or warnings or notifications to a user. For example, FIG. 2 includes an audible/visual/haptic indicator 56 as part of the control system 50. Indicator 56 can include one or more of an LED, a display, a light, a speaker, and the like. Indicator 56 receives signals from processor 52 to communicate information to a workstation user. For example, the control system 50 can be configured to move the work surface 26 between a sitting height and a standing height at predetermined time intervals, and the processor can provide an audible and/or visual and/or haptic (e.g., vibration or small smooth movements of worktop 24) signal to the user via indicator 56 before beginning to move the work surface 26, to provide a warning to the user to prepare the user for the motion. In some cases, indicator 56 can provide a reminder to the user to change a position of the user (e.g., without a corresponding automatic movement of the work surface 26). For example, the control system 50 can be configured to remind the user to change from a sitting position to a standing position after an hour of sitting, and vice versa.

As further shown, control system 50 includes one or more drive mechanisms for adjusting positions of the workstation (e.g., for adjusting one or more affordances). For example, a Motor/Drive Mechanism 58 can be provided to adjust a height of the worksurface. The drive mechanism 58 can be similar or identical to the drive mechanism described with respect to FIG. 1 for driving a height of the telescoping legs 20. The drive mechanism receives signals from processor 52 to adjust the height of worktop 24 (e.g., as shown in FIG. 1), by continuously raising or lowering worktop 24, moving worktop 24 to the standing height, or moving the worktop 24 to the sitting height. Drive mechanism 58 provides signals to processor 52 indicating a current position of worktop 24. For example, the drive mechanism 58 can have integrated therein a position sensor to sense a height of the worktop 24 and can signal to processor 52 that a desired/present/stored/preferred height has been reached.

Figure 5:
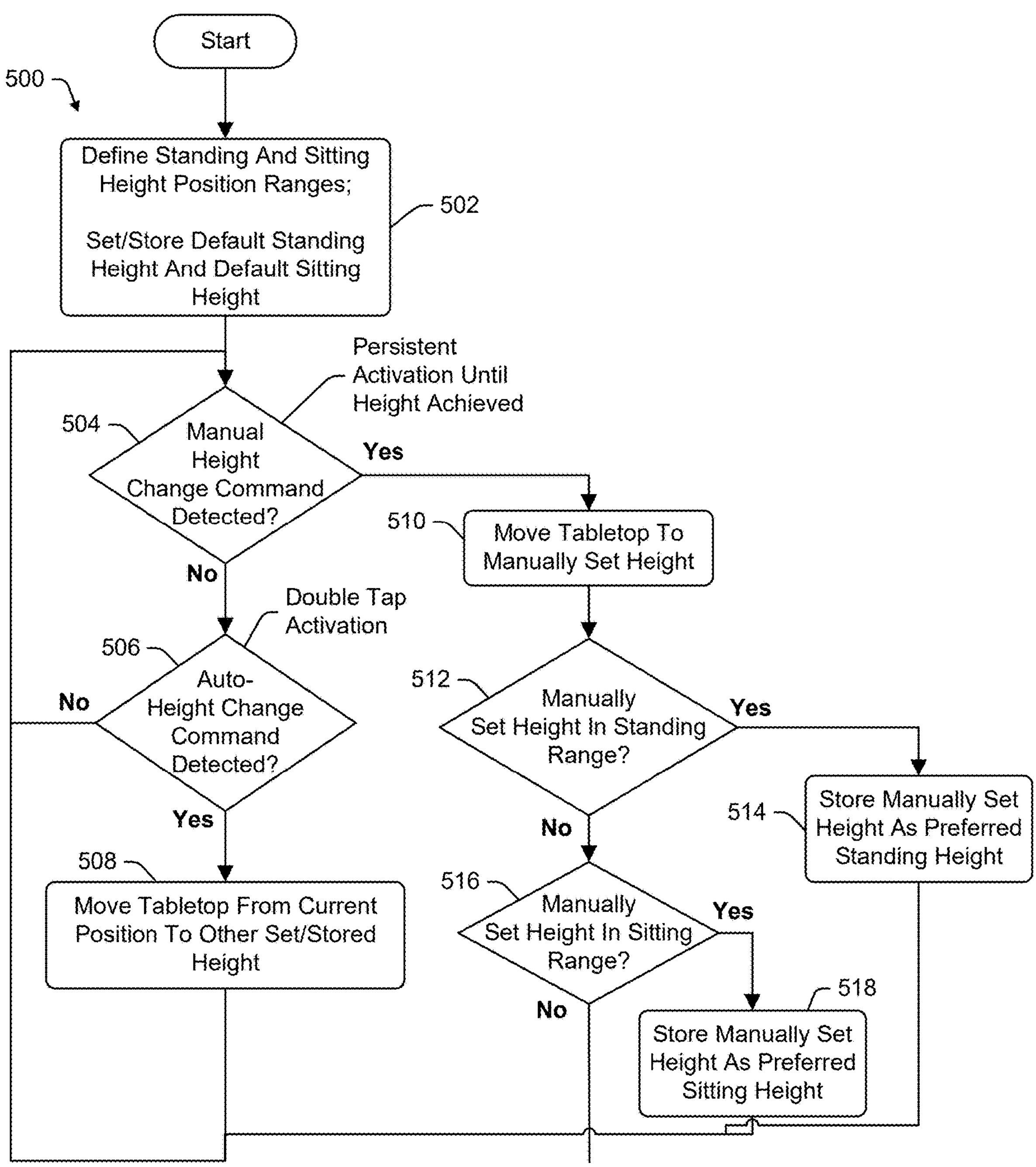
FIG. 5 is a flow chart illustrating an exemplary process for setting user-preferred heights for a sit-stand workstation that is consistent with at least some aspects of the present disclosure.

FIG. 5 illustrates an exemplary process 500 for setting and storing user-preferred height settings for a workstation (e.g., workstation 10 shown in FIG. 1) and controlling worktop height that is consistent with at least some aspects of some embodiments of the disclosed system. Process 500 is executed by processor 52 and can operate to change a height of worktop 24 in response to commands entered via interface 40. In some cases, process 500 is continuously executed in a loop while there is power to the workstation or while a control system of the workstation (e.g., control system 50) is switched on.

At process block 502, sitting and standing height position ranges (e.g., as illustrated in FIG. 1) are set/stored for workstation 10, and default sitting and standing heights are set. The sitting and standing height ranges, and default sitting and standing heights are stored in memory 54. The default values may be set at a factory before delivery of workstation 10 to a workspace or facility. In some cases, these values can be set at an initial setup of the workstation as part of commissioning the workstation. In some cases, a workstation may not include default sitting and standing heights, and an initial use of the workstation can require a user to manually set the standing and/or sitting height (e.g., through execution of all or a portion of blocks 504 and 510-518) before automatic height adjustment is available for use.

At block 504, processor 52 determines if a manual height change command is detected. In some cases, the manual height change command can be a signal received at a control element of interface 40 shown in FIG. 3. In some cases the manual height change command can be indicated by a press and hold operation of interface 40, as described above.

If no manual height change command is detected at block 504, at block 506, processor 52 determines whether an auto-height or auto-move change command (e.g., a command to automatically raise worktop 24 to a standing height or automatically lower worktop 24 to a sitting height, as illustrated in FIG. 1) is detected. In some embodiments, an auto-height change command is received through a double tap of a control element of interface 40. If no auto-height change command is detected at block 506, the process loops back to block 504 to determine if a manual height change command is detected. In some cases, a process for implementing user height preferences for a workstation can evaluate if an auto-height change command is detected before determining if a manual height change command is detected, or can make both determinations simultaneously or independently.

In some cases, an auto-height change command can originate from a memory or processor of a control system for a workstation (e.g., the auto-height change command is not user generated). For example, an auto-height change command can be generated according to a set schedule or at regular time intervals, and when the time interval has been reached, an auto height change command can be generated as a trigger event to cause the processor to control the drive mechanism 58 to change the height of the work surface.

If, at block 506 an auto-height change command is detected, at block 508 processor 52 controls the motors to drive worktop 24 to one of the set/stored preferred heights. For example, if worktop 24 is at a preferred standing height, or within the standing height range, the worktop 24 is moved to the set/stored sitting height upon receipt of the auto-height change command at block 506. Similarly, if worktop 24 is positioned within the sitting range, or at the sitting height, an auto-height change command causes worktop 24 to be raised to the set/stored standing height. After worktop 24 is moved at block 508, processor 52 continues to monitor for a manual or auto-height change command.

Referring still to FIG. 5, if, at block 504, a manual height change command is detected (e.g., when a user presses and persistently holds a control element of an interface), at block 510 processor 52 drives worktop 24 in the direction requested by the user while the activation command persists. In some cases, manually moving worktop 24 to a desired height can include electronically operating a drive mechanism (e.g., drive mechanism 58) to raise or lower the work surface until one of: (a) the user releases the control element and the manual height change command is no longer provided to the system or (b) the work surface reaches either of the maximum standing height or the minimum sitting height. Block 510 is continuously performed until the work surface is at the desired height (e.g., when the user releases or disengages the control element).

Continuing, at process block 512, processor 52 determines if the current height (e.g., the manually set height) is in the standing range (e.g., if the height of worktop 24 is between the boundary 41 and the maximum standing height). In some cases, a current height can be sensed using a position sensor, which can measure a distance between a worktop and the floor, or between a fixed portion (first element) of the workstation and worktop 24 (second element). In some cases, a height can be determined through other means.

If the current height is within the standing height range, the current height is set as the stored preferred standing height at block 514. Setting the preferred standing height at block 514 can include overriding a previously set preferred standing height (e.g., in memory 54 shown in FIG. 2). Subsequent commands to automatically raise the height to the standing position (e.g., at block 506) then cause the processor to raise worktop 24 to the current position (e.g., as manually set by the user at block 510).

If the height of the work surface (e.g. as set at block 510) is not within the standing range, processor 52 determines if the height of the worktop 24 is within the sitting range. In some embodiments, processor 52 evaluates whether worktop 24 is in the sitting range before evaluating whether worktop 24 is in the standing range (e.g., block 516 can precede block 512).

In some cases, there is no evaluation of whether the height is within the sitting range, and if the system determines at block 512 that the height of the work surface is not in the standing range, the process proceeds directly from block 512 to block 518. In some embodiments, a control system can evaluate only whether the height of the work surface is within the sitting range (e.g., at block 516) and if not, the process can implement the procedures under block 514 and set and store a standing height of the work surface. If the manually set height (e.g., as set in block 510) is not in the sitting range at block 516, the process can proceed back to block 504 and continue to monitor for commands.

If, at block 516, the system determines that the height of worktop 24 is within the sitting height range, the current height is set as the stored preferred sitting height at block 518. Setting the stored preferred sitting height at block 518 can include overriding a previously set sitting height (e.g., in the memory 54 of the control system 50 shown in FIG. 2). Subsequent commands to automatically lower the height to the sitting position (e.g., at block 506) can then lower worktop 24 to the stored preferred position (e.g., as manually set by the user at block 510). Process 500 proceeds back to block 504 and loops through the process steps continuously as described above.

At the end of a period of workstation use (e.g., the end of a day), stored preferred standing and sitting heights are maintained in memory 54 for use during a next period of workstation use. Then during the next period of workstation use, the stored preferences are used as the preferred settings until changed by a user (e.g., by any user).

Figure 6:
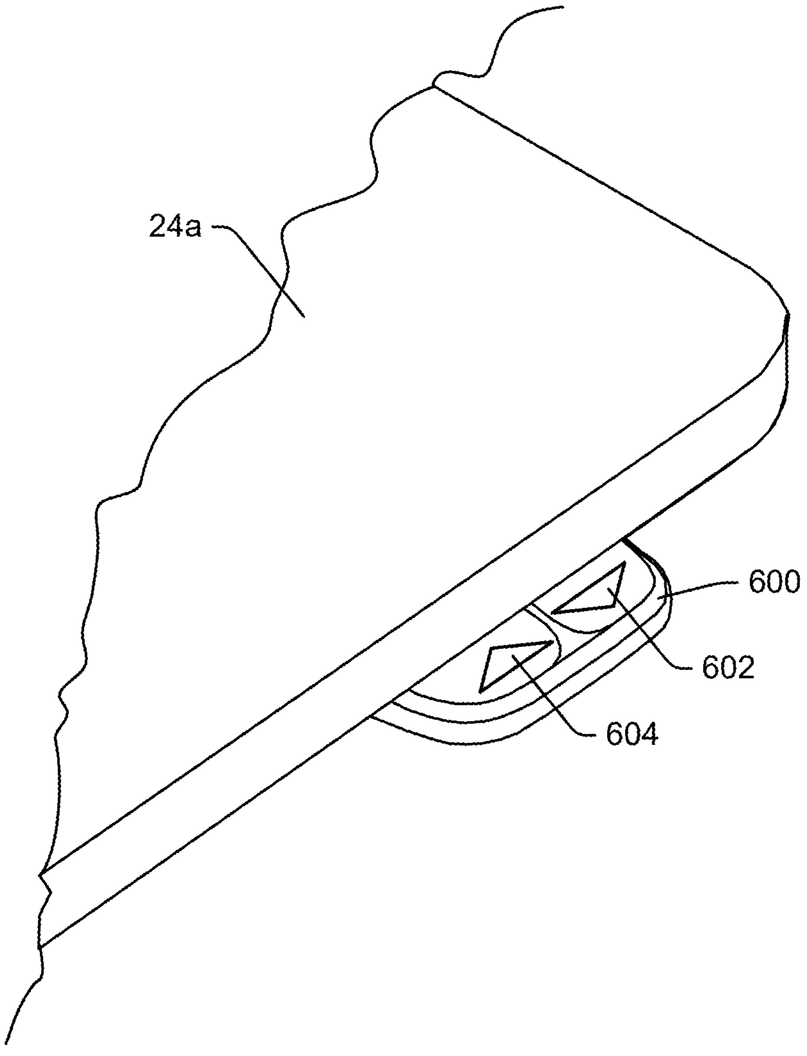
FIG. 6 is a partial top angled perspective view of a worktop of the FIG. 1 workstation showing another exemplary interface device that is consistent with at least some aspects of the present disclosure.

In some cases, interfaces of a height-adjustable workstation can include other configurations. For example, FIG. 6 illustrates a worktop **24*a*, with an interface 600 mounted thereto, via which a user can provide commands to raise or lower the worktop 24*a*. As shown, the interface 600 includes two buttons, a right button 602 and a left button 604. The buttons have visual indicators of directions associated with the respective buttons. For example, FIG. 6 illustrated a preferred embodiment, with a triangle pointed away from the worktop 24*a* on the right button 602, to indicate that the button is a button for lowering the worktop 24*a*. The left button 604 in the illustrated embodiment includes a triangle pointed in the direction of the worktop 24*a* to indicate that the left button 604 is a button for raising the worktop 24*a***. In some embodiments, other visual indicators can be provided on buttons of an interface, including text, arrows, schematics, etc.

Each button 604 and 602 includes a sensor for detecting contact therewith and processor 52 is programmed to recognize at least a manual height adjust input via each of the buttons as well as an auto-move height adjust input via each button. For instance, persistent pressing of button 604 may be recognized as a manual upward height adjustment command, persistent pressing of button 602 may be recognized as a manual down height adjustment command, a rapid double tap and release of button 604 may be recognized as an auto-move upward command, and a rapid double tap and release of button 602 may be recognized as an auto-move downward command.

Figure 7:
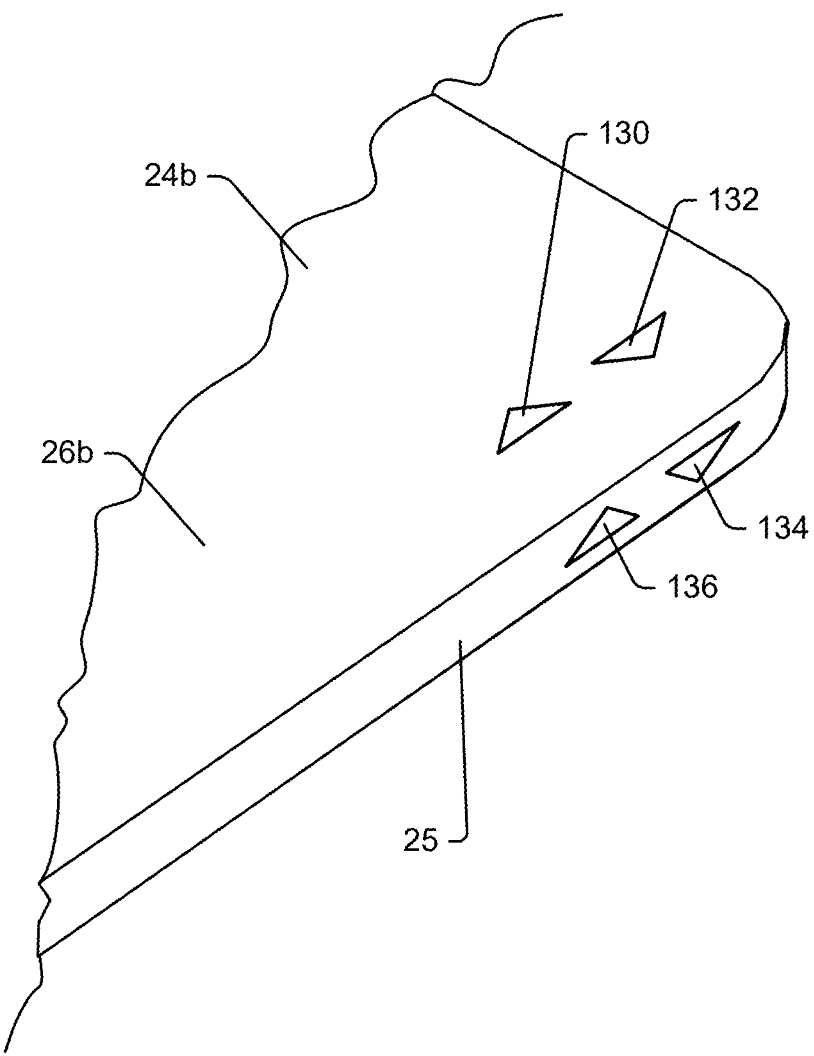
FIG. 7 is a is similar to FIG. 6, albeit showing two additional interface types, each consistent with at least some aspects of the present disclosure.

The workstation interface in other embodiments is embedded in a worktop of the workstation. For example, FIG. 7 illustrates a worktop 24*b*, with buttons 130, 132 provided in worksurface 26*b* along an edge of worktop 24*b*, and buttons 136, 134 provided within an edge surface 25 of worktop 24*b*. Button 132 is provided for lowering worktop 24*b* while button 130 is for raising worktop 24*b*. Embedding control elements in a worktop of a workstation can advantageously reduce a total depth of the workstation, which can reduce a risk of damaging the interface assembly during worktop movement. In some cases, buttons 136 and 134 can be redundant to buttons 132 and 134, respectively, or can be provided instead of buttons 130 and 132.

In some cases, buttons 136 and 134 can be provided to control different workstation settings than buttons 130 and 132. For example, buttons 136 and 134 can be operatively connected to processor 52 to move worktop 24*b* forward and/or rearward via a separate drive mechanism relative to the supporting leg structures 20 while buttons 130 and 132 control worktop height.

Figure 8:
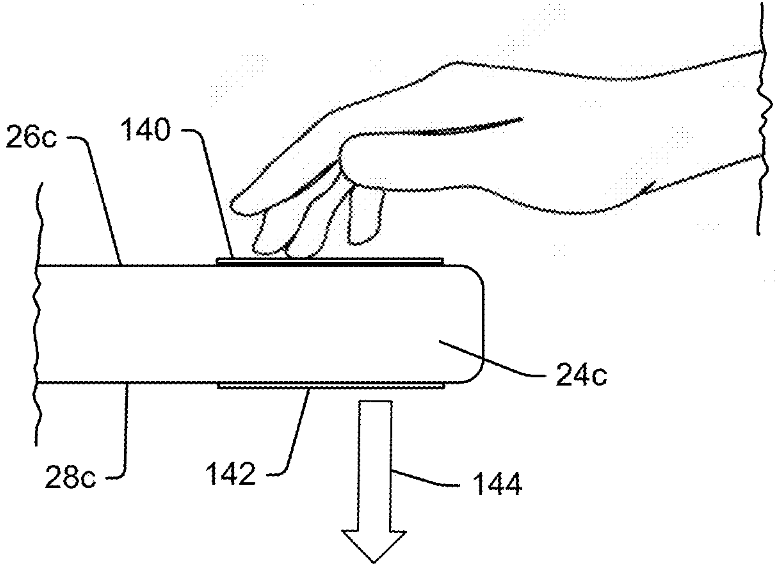
FIG. 8 is similar to FIG. 4A, albeit showing a different interface arrangement.

FIG. 8 illustrates another example of an interface for a workstation. A top control or activation device 140 of the FIG. 8 interface is provided along (e.g., can be embedded into or extend from) a top surface 26*c* of worktop 24*c* and a bottom control or activation device 142 of the interface is provided along an underside 28*c* of worktop 24*c*. Each of the top activation device 140 and the bottom activation device 142 can include a control element, which can be a touch sensitive surface (e.g., a touch screen), a button, or other control element. A user can engage the top portion 140 to move worktop 24*c* in a downward direction 144 (e.g., according to process 500 shown in FIG. 5), and the user can engage the bottom portion 142 to move worktop 24*c* upward.

In a workstation including the FIG. 8 interface, again, the processor is programmed to recognize a persistent selection or activation as a manual height adjustment command and to recognize some other gesture different than a persistent activation as an auto-move command. Thus, in some cases for instance, constant force applied to activation device 140 causes the processor to move worktop 24*c* downward as indicated at 144 until the user releases device 140 but a double tap and release activation of device 140 causes the processor to move worktop 24*c* to a currently stored and preferred sitting height.

A particularly simple interface may include a single activation button or activation device where, when the button is persistently selected, the processor manually drives the worktop along a complete height adjustment cycle until the user releases the button at a preferred standing or sitting height. For instance, when the single button is pressed and held, regardless of the current position/height of the worktop, the worktop may first be driven upward toward the maximum standing height and, if that height is reached, may be driven back downward toward the minimum sitting height. Here, any time the worktop is halted at any position, the processor may be programmed to identify the position range (e.g., standing range or sitting range) of the worktop and set the preferred sitting or standing height as described above based on which of the position ranges the worktop is in when worktop height is halted. Here, once preferred standing and sitting heights have been set and stored, the single button may be used to enter an auto-move command (e.g., via a double tap and release) and, in response, the processor would drive the worktop from a current position to the preferred stored position in the other of the position ranges.

In still other embodiments, referring again to FIG. 7, a dial or knob 135 may be provided that can be persistently rotated clockwise or counterclockwise to raise or lower the worktop 26*b* to standing or sitting heights. Thereafter, when an auto move command is received to lower the worktop to a user's preferred height, the drive could automatically change worktop height to the newly set and stored preferred sitting height. For instance, a quick double counterclockwise rotation and release activity of dial 135 may generate an auto move to the sitting position. A similar double clockwise rotation and release would similarly generate an auto move to a stored standing height. Other input devices are contemplated including, for instance, foot pedals, non-touch gesture sensing devices, etc.

The height adjustable workstation is described above in the context of a system wherein it is assumed that a user has only two preferred heights, a preferred standing worktop height and a preferred sitting worktop height. In at least some embodiments it is contemplated that a workstation user may in fact have more than two preferred heights. For instance, a user may use first and second different seated support structures (e.g., a task chair and a balancing ball) at different times where the support structures support the user at different seated heights and therefore would most likely have two different preferred seating heights, depending on which support structure the user currently employs.

To accommodate users that have three or more different preferred worktop heights, in at least some embodiments there will be three or more different position ranges where a user can set any one of the preferred heights by simply manually moving a worktop 24 to a new position within one of the position ranges. Thus, for instance, in a case where a range of worktop motion is divided into upper, intermediate, and lower position ranges with the intermediate position range between the upper and lower ranges, a user could set and store upper, intermediate, and lower preferred positions within the upper, intermediate, and lower ranges by manually moving worktop 24 to different positions within those ranges. Here, once three preferred positions are set, auto-move commands would drive the worktop 24 to a next position along a trajectory selected via an auto-move command. For instance, if worktop 24 is initially in a lowest set position and a user enters an auto-move upward command, the worktop would be moved upward to the intermediate position and then, if the user enters a second auto-move upward command, the worktop would be moved upward to the upper position.

Where a workstation defines three or more position ranges, a user could still select only first and second positions in two of the position ranges to set up the workstation for auto-movement between the first and second positions. For instance, after a user sets a lower position in a lower position range, the user may move the worktop manually to a position in the upper position range skipping over the intermediate range and the processor may store the upper position as a second set position without storing an intermediate position.

Once preferred heights in each range are stored, any manual move and halt at a fourth position that is not one of the three stored preferred heights would cause the processor to identify the height range at which the worktop halts and store the current height as a new preferred height for that range for use during subsequent auto-movement.

While the disclosure above describes a workstation height preference setting system, the disclosure is applicable to systems for setting other workstation component juxtaposition preferences. For instance, with respect to a worktop 24 (FIG. 1), other worktop settings may include an angle of the upper surface 26 of worktop 24 relative to the leg support structure 20 therebelow, a sliding position of worktop 24 along a forward-rearward trajectory with respect to the supporting legs and extending between front and rear worktop edges (e.g., a user may prefer the worktop to be in a relatively more forward position when standing than when sitting), etc., where a user may have first and second preferred juxtapositions to be used at different times. In these cases, a drive mechanism may be provided to change worktop angle or forward-rearward position and auto-move commands may be used to drive the worktop between first and second preferred positions. Here, to set the preferred positions, similar to the system described above, a user may simply manually drive the worktop to a preferred angular position or forward position within a position range and the processor may automatically store the new position as a preferred position for the position range to be used during subsequent auto-adjustments to worktop positions.

In addition, while the above disclosure is described in the context of a height adjustable workstation, it is contemplated that the control and setting system may be implemented in the context of other office affordances or articles of furniture where different users have different preferred settings and routinely adjust the affordances or furniture between the different settings. For instance, a workstation may include additional components or elements that can have height or other adjustable operating characteristics which can accommodate different working positions of a user (e.g., a sitting position, a standing position, and the like).

Figure 9:
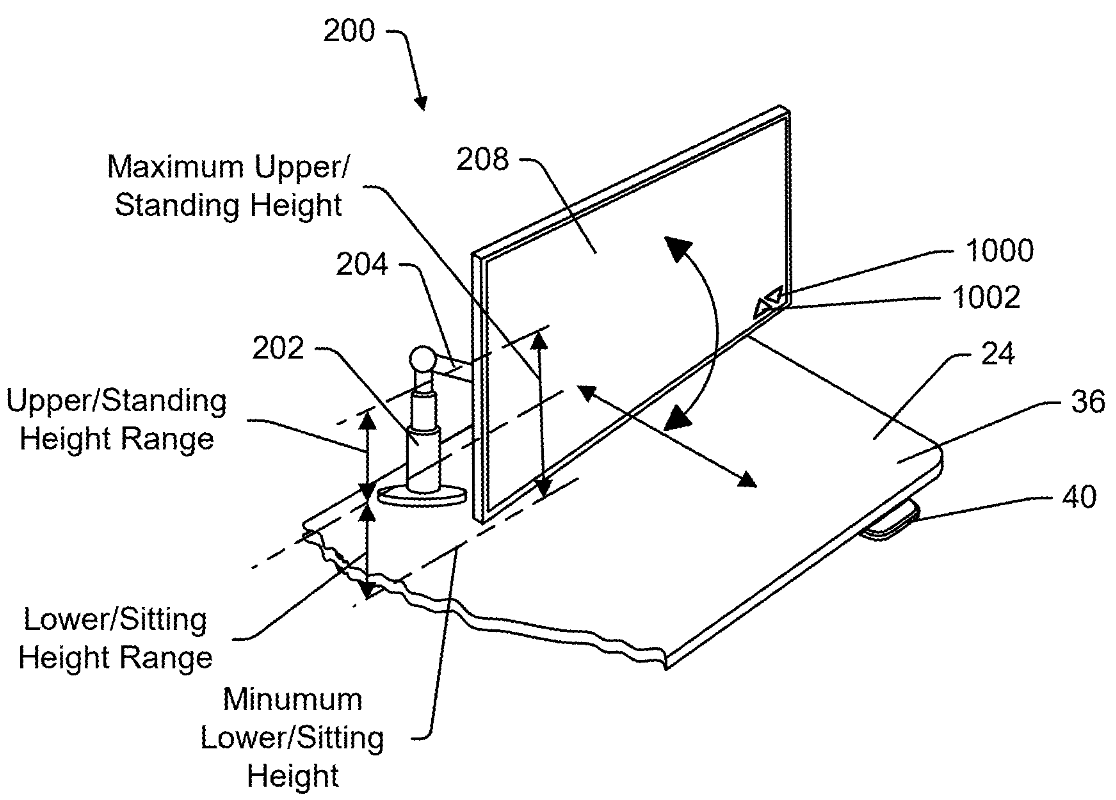
FIG. 9 is a partial front perspective view of a monitor stand assembly, according to some aspects of the present disclosure.

For example, as further shown in FIG. 1 and also in FIG. 9, workstation 10 includes a monitor stand assembly or support arm structure 200, which can include, for example, a telescoping base 202 and a swing arm 204 configured to adjust a juxtaposition (e.g., height, angle about a vertical axis, angle about a horizontal axis, etc.) of a monitor 208. The juxtaposition of monitor 206 can be adjusted by one or more of extending or retracting the telescoping base 202 or by controlling a position of the swing arm 204 or other components relative to worktop 24. The monitor 206 may include one or more drive mechanisms (e.g., a motor and gears) controlled by processor 52 or a separate processor. Preferred positions of monitor 206 can be stored (e.g., like preferred heights of the workstation 10) to accommodate user preferences.

In some embodiments, referring again to FIG. 2, a monitor motor/drive mechanism 60 is provided to electronically adjust a position of a monitor (e.g., to control a position of the telescoping base 202 and swing arm 204 to set a position of the monitor 206 as shown in FIG. 1). The drive mechanism 60 can receive instructions from processor 52 and provide monitor position information to the processor 52 (e.g., like drive mechanism 58) to implement position control algorithms.

Referring to FIG. 9, a separate interface 1000, 1002 akin to interface 40 in FIG. 2 may be provided as touch selectable buttons on the monitor display for providing commands to processor 52 for adjusting the position of the monitor to meet user preferences. A hardware control interface for the monitor is also contemplated. While the exemplary interface includes only two buttons 1000, 1002, the monitor interface may include several buttons for adjusting various juxtaposition parameters with respect to worktop 214 or some other secondary workstation or support arm element. Here, as in the case of the workstation generally, a user may have first and second preferred monitor juxtapositions relative to worktop 24. For instance, in many cases, a user will prefer a monitor to be at a first position relative to worktop 24 when worktop 24 is at a preferred seated height and a second relatively higher position relative to worktop 24 when worktop is at a preferred standing height.

Monitor control interface 1000, 10002 operates in a fashion similar to the way the height adjustable workstation interface operates as described above, where a user can manually move the monitor to a preferred position within either of upper and lower height ranges (or other parameter ranges like angular range about a horizontal axis, angular range about a vertical axis, etc.) and processor 52 stores the position as a new preferred position associated with the upper or lower height range for subsequent use in auto-moving the monitor to that position. When an auto-move command is received for changing monitor juxtaposition, processor 52 moves the monitor from a current preferred juxtaposition to the other of the preferred juxtapositions.

In at least some cases it is contemplated that monitor juxtaposition may be tied to the worktop height so that when the worktop height is automatically changed to a preferred stored height, the drive mechanism(s) for the monitor automatically drives the monitor to an associated preferred juxtaposition relative to the worktop. Here, the worktop height would be a primary element position and the monitor position would be a secondary element position where the secondary element position "follows" the primary element position. In at least some embodiments, once preferred worktop heights are set and stored, with the worktop at the preferred standing height, if the user adjusts the juxtaposition of the monitor relative to the worktop, that monitor position may be stored as a preferred standing height monitor position which is associated with the preferred and stored worktop standing height. Similarly, with the worktop in the preferred sitting height, if the user adjusts the juxtaposition of the monitor relative to the worktop, that monitor position may be stored as a preferred sitting height monitor position which is associated with the preferred and stored worktop sitting height.

Here, in some embodiments the preferred standing height position for the monitor may need to be in a standing height range and the preferred sitting height position for the monitor may nee to be in a sitting height range. In other embodiments where monitor height or some other juxtaposition setting is tied to worktop height, the monitor height may not need to be within a specific standing or sitting height range. For example, with the worktop at a preferred 26 inch sitting height, if the user manually adjusts the display height to 8 inches, regardless of if the 8 inch height is in any standing or sitting height range, the 8 inch height may be automatically stored as the preferred sitting height for the display so that a subsequent auto-move of the HAD to the preferred sitting height causes the processor to drive the display to the 8 inch height. Similarly, with the worktop at a preferred 42 inch standing height, if the user manually adjusts the display height to 10 inches, regardless of if the 10 inch height is in any standing or sitting height range, the 10 inch height may be automatically stored as the preferred standing height for the display so that a subsequent auto-move of the HAD to the preferred sitting height causes the processor to drive the display to the 10 inch height.

Thereafter, when the worktop is auto moved to one of the preferred standing or sitting heights, processor 52 may drive the monitor to the associated preferred standing or sitting juxtaposition either simultaneously or after the worktop height has been changed. Thus, the disclosure includes a system where preferred juxtapositions of some workstation elements can be easily tied to preferred juxtapositions of other workstation elements so that when one element position is changed, positions of other elements that are associated with the new position of the one element can also be automatically changed. This "following position" feature is also applicable to other HAD settings. For instance, worktop angle and/or forward position settings may follow height settings when changed.

Figure 10A:
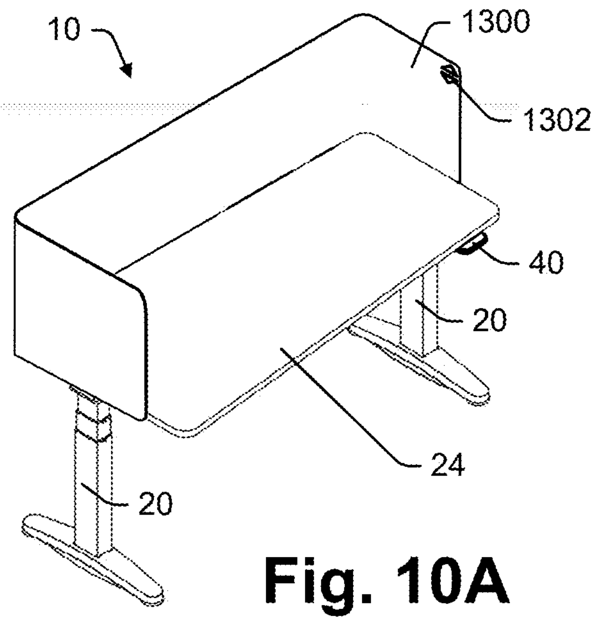
FIGS. 10A and 10B are front perspective views of a workstation including a motorized privacy shield or screen that is consistent with at least some aspects of the present disclosure.
Figure 10B:
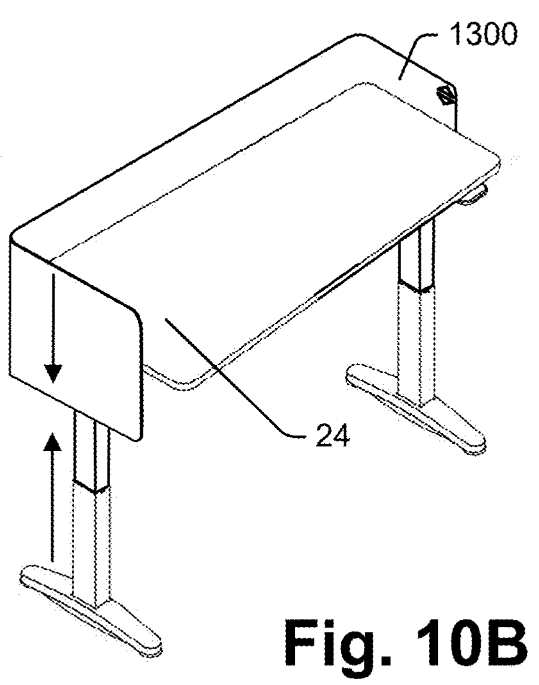

In addition, in at least some embodiments it is contemplated that drive mechanisms may be provided and controlled for changing juxtapositions of other furniture articles or affordances in addition to a worktop and/or a display monitor. For instance, systems are contemplated for setting preferences for and controlling the position of a privacy screen relative to a workstation worktop as shown in FIGS. 10A and 10B. In FIG. 10A a screen 1300 is shown in an upper position relative to worktop 24 and in FIG. 10B the screen is shown in a lower position relative to the worktop 24. A screen control interface 1302 allows a user to move the screen up and down randomly. Again, here, the system processor 52 may be programmed to identify any position of screen 1300 within a first or a second position range relative to the worktop 24 and to store any new position of the screen 1300 as a preferred position to use thereafter in response to auto-move commands. Again, a persistent activation of one of the up or down buttons that make up interface 1302 may manually move the screen up or down and a double click or other auto-move activation may cause auto movement to one of the stored preferred positions.

Figure 11:
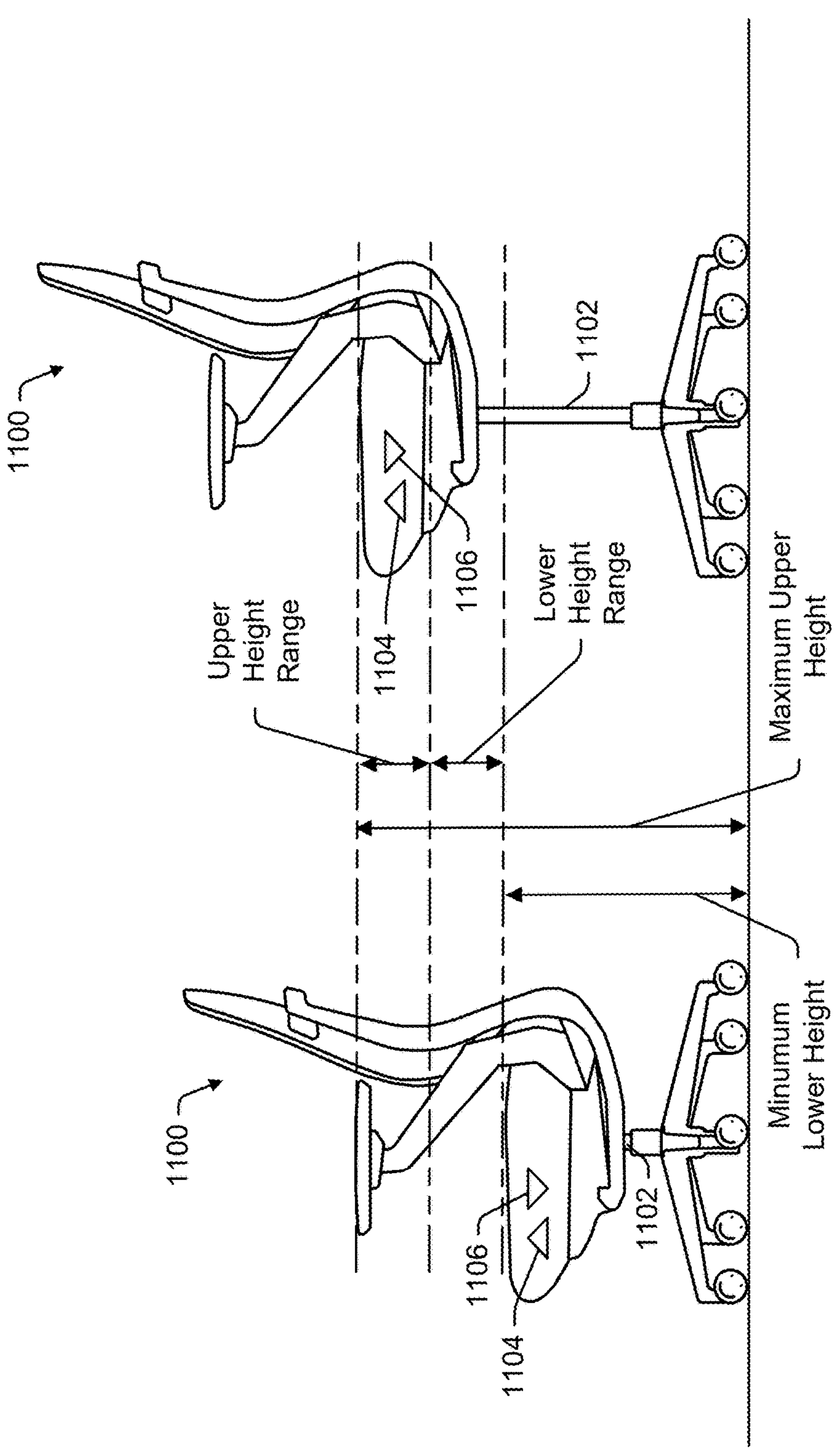
FIG. 11 is a side elevation view of a chair at a lower height and an upper height.

As yet one more instance, see the chair 1100 in FIG. 11 that is shown at lower and upper heights and where upper and lower height or position ranges are labelled. In addition to including a seat and backrest structure, chair 1100 includes a height adjustable column 1102, a processor (not illustrated) and a drive mechanism (not illustrated) for changing the length of column 1102 and hence seat/backrest height. In FIG. 11, up and down activation devices 1104 and 1106 are provided on a side surface of the chair seat for moving the seat and backrest upward and downward, respectively. Here, again, each activation device is dual purpose where persistent activation of the up device 1104 causes a drive mechanism to drive the chair upward until device 1104 is released, persistent activation of down device 1106 causes the drive mechanism to drive the chair downward until device 1106 is released, a double tap and release activation of up device 1104 drives the chair upward to a stored upper preferred height and double tap and release activation of down device 1106 drives the chai downward to a stored lower preferred height. In addition, when any manual activation of one of devices 1104 or 1106 ends, a processor (not illustrated) determines which of the upper and lower height or position ranges the chair position is in and, if the chair position is in the upper range, the processor automatically stores the current position as a new preferred upper position for the chair and, if the chair position is in the lower range, the processor automatically stores the current position as a new preferred lower position for the chair.

While not shown, modern task chairs are highly adjustable so that the seat depth, seat angle, backrest angle, backrest stiffness, support arm height, support arm position, etc., are all adjustable. Here it is contemplated that in any case where a powered drive mechanism is provided to modify chair element juxtapositions, a control system akin to those described above may be provided so that a user can intuitively and easily set user preferences for auto-move control between stored user preferences.

In addition, as in the case of the height adjustable workstation and display, one chair element position may be set as a primary element position where other chair element positions are automatically adjusted to preferred positions as a function of the position of the primary element. For instance, in the case of a chair, chair height may be a primary element position where seat depth, seat angle, backrest angle and backrest stiffness are all automatically controlled based on chair height. Here, again, with the chair height set to a preferred height, any changes to other chair element juxtapositions may be automatically associated with the current preferred height for subsequent automatic adjustment until those element juxtapositions are manually changed.

Figure 12:
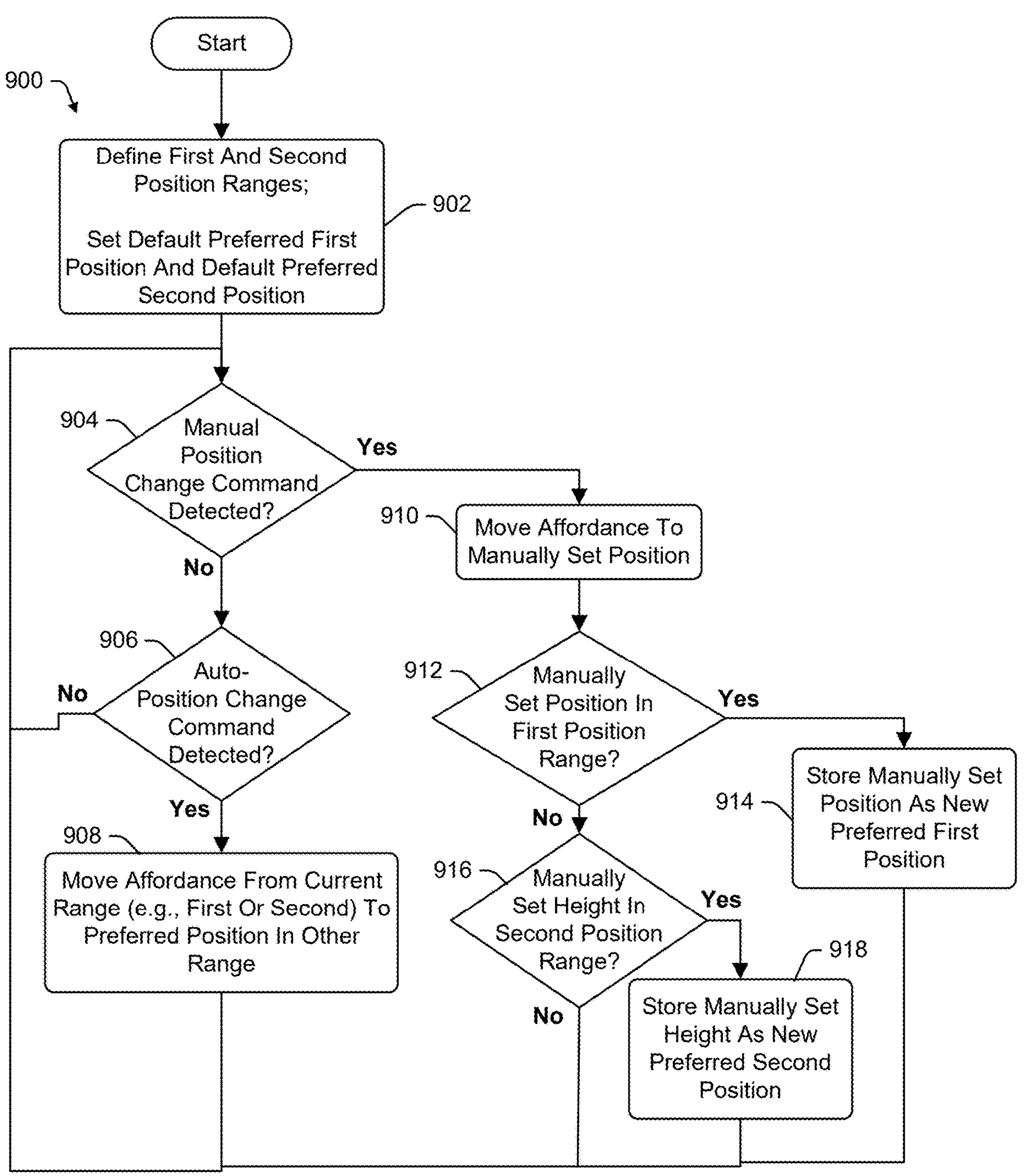
FIG. 12 is a flow chart illustrating an exemplary process for setting user-preferred positions for affordances according to some embodiments of the present disclosure.

FIG. 12 is like FIG. 5, albeit showing a more general process 900 of controlling any type of affordance or furniture arrangement (e.g., a chair, a screen, a monitor arm, etc.) and for intuitively and quickly setting and storing user preferences. At process block 902, first and second position ranges are set and stored that correspond to juxtapositions of a first element with respect to a second element in a furniture affordance. Default preferred positions of elements are set for each of the first and second position ranges. For example, the first and second position ranges and the corresponding first and second preferred positions can be stored in a memory of a control system for the furniture affordance.

At block 904, a processor determines if a manual position change command has been detected (e.g., persistent activation of an input device). In some cases, the manual position change command can be a signal received at a control element of an interface. In some cases the manual position change command can be indicated by a press and hold operation at a control element of the interface, as described above.

If no manual position change command is detected at block 904, at block 906 the processor determines whether an auto-position change command (e.g., a command to move an element of the article of furniture from a current position to a different preferred position) is detected. An auto-position change or auto-move command can be received through a double tap and release of a control element or activation device of the interface. If no auto-position change command is detected at block 906, the process loops back to block 904 where the processor again determines if a manual position change command is detected.

In some cases, a process for implementing user position preferences for an article of furniture can evaluate if an auto-position change command is detected before determining if a manual position change command is detected, or can make both determinations simultaneously or independently. In some cases, an auto-position change command can originate from a memory or processor of a control system for an article of furniture (e.g., the auto-position change command is not user generated). For example, an auto-position change command can be generated according to a set schedule or at regular time intervals, and when the time interval has been reached, a command can be provided to change the position of the article of furniture (e.g., to move the affordance to one of the first preferred position or the second preferred position).

If, at block 906 an auto-position change command is detected, the process proceeds to block 908, the processor moves the furniture element from the current position to one of the first and second preferred positions. For example, if the affordance is at the first preferred position, or within the first position range, the affordance can be moved to the second preferred position upon receipt of the auto-position change command at block 906. Similarly, if the affordance is positioned within the second range, or at the second preferred position, an auto-position change command can cause the affordance to be moved to the first preferred position. After the affordance is moved to the preferred position at block 908, the process can continue to monitor for a manual position change command or an auto-position change command.

If, at block 904, a manual position change command is detected (e.g., when a user presses and holds a control element or activation device of an interface) the process proceeds to block 910 where the furniture element position is changed until the user releases the activation device. In some cases, manually moving the element to a desired position can include electronically operating a drive mechanism (e.g., drive mechanism 98) to move the affordance until one of: (a) the user releases the control element and the manual position change command is no longer provided to the system or (b) the affordance reaches either of a first position limit (e.g., a maximum height, angular rotation, lateral position, longitudinal position, tilt, etc.) or a second position limit (e.g., a minimum height, angular rotation, lateral position, longitudinal position, tilt, etc. Block 910 is performed until the affordance is at the desired position (e.g., when the user releases the activation device).

When block 910 is completed, at block 912 the processor determines if the current position (e.g., the manually set position) is in the first position range. In some cases, a current position can be sensed using a position sensor. In some cases, a position can be determined through other means including through calculating a change of position using a gyroscope, an accelerometer, or other mechanism. If the current position is within the first position range, the current position is set as the preferred first position at block 914. Setting the preferred first position at block 914 can include overriding a previously set first preferred position (e.g., the default first preferred position). Subsequent commands to automatically raise the position to the first preferred position (e.g., at block 906) then move the element to the newly stored first preferred position (e.g., as manually set by the user at block 910).

If the position of the affordance (e.g. as set at block 910) is not within the first position range, at block 915 the processor determines if the position of the element is within the second position range. In some embodiments, the process 900 can evaluate whether the affordance is in the second position range before evaluating whether the affordance is in the first position range (e.g., block 916 can precede block 912). In some cases, there is no evaluation of whether the position of the affordance is within the second position range, and if the system determines at block 912 that the position of the affordance is not in the first position range, the process can proceed directly from block 912 to block 918. In some embodiments, a control system can evaluate only whether the position of the work surface is within the second position range (e.g., at block 916) and if not, the process can implement the procedures under block 914 and set a target first position of the affordance. If the manually set position (e.g., as set in block 910) is not in the second position range at block 916, the process proceed backs to block 904 and the processor continues to monitor for commands.

If, at block 916, the system determines that the position of the affordance is within the second position range, the current position can be set as the preferred second position at block 918. Setting the preferred second position at block 918 can include overriding a previously set preferred second position (e.g., the default preferred second position). Subsequent commands to automatically move the affordance to the preferred second position (e.g., at block 906) can then move the affordance to the current position (e.g., as manually set by the user at block 910). The process 900 proceeds back to block 904 and the processor continues to monitor for commands.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

Other interface types are contemplated. For instance, referring again to FIG. 2, a workstation 210 may include a microphone 62 for receiving verbal manual and/or auto-position change commands. For instance, a user may verbally utter "move worktop up to 42 inch height" to manually adjust the worktop upward to a preferred standing height. Here, the worktop processor 52 recognizing that the 42 inch height is within a standing position range, would automatically store the 42 inch height as a preferred standing height and thereafter, any time an auto-position command to move to the preferred standing height is received, the processor 52 would automatically move the worktop to that height. For instance, the user may utter "Move worktop to preferred standing height" to auto-move the worktop to the prior set 42 inch preferred height. Similar utterances may be captured by the microphone and used to set preferring sitting height and to auto-position to the preferred sitting height.

Other preferences related to affordance operation may also be intuitively and easily set using aspects of the present disclosure. For instance, in some cases the FIGS. 3 and 4A through 4C paddle type controller may be used to control worktop height adjustment speed where the speed is controllable based on the level of force applied to the paddle. For instance, in some embodiments there may be three height adjustment speeds including fast, moderate and slow, where a sensor in the paddle detects large, moderate and small forces applied to the paddle and control worktop height change to be fast, moderate and slow, respectively. When a user applies a large force to the paddle during manual height adjustment to change the worktop height quickly, the processor may store that fast preference for subsequent automatic height adjustments. Similarly, when the user applies a small force to the paddle during manual height adjustment to change the worktop height slowly, the processor may store that slow preference for subsequent automatic height adjustments.

In other embodiments other interfaces are contemplated where a user selects up height adjustment speed and down height adjustment speed that are then used during auto-position changes and/or during manual position changes.

In some cases, even if a user specifies a fast worktop height change, the processor may control height change speed differently based on duration of a height change activity. For instance, in a case of manual worktop height adjustment, during a first 1 second of height change, the height may be changed at a first rate and thereafter the height may be changed at a second rate that is faster than the first rate. In this way, a user can make relatively small height changes without driving the worktop past a desired height that is near a starting height.

In some cases, adjustments of two or more affordances may be tied together in a following relationship. For instance, in some cases it is contemplated that a sensor in a chair may detect when a user sits in the chair or stands at a workstation and may provide control signals to the HAD processor to adjust height and other preferences of the HAD automatically. For example, when a user moves from a seated position to a standing position that action may trigger an auto-move from the sitting height to the standing height of the HAD without any other user input.

In some cases, a user's portable computing device may pair with a HAD or other affordance and the user interface for manual and auto-move control input may be provided via virtual buttons on a touch screen of the computing device.

In some embodiments, in addition to setting and storing preferred user HAD standing and sitting height preferences, the system may enable a user to set maximum an minimum HAD heights that are different than the extremes heights that the worktop can be moved to. For instance, in a case where a shelf is located above a HAD and at a height that is lower than the extreme high height that a worktop can be moved to, to avoid a collision with the shelf, a user may want to set a maximum HAD height below the shelf height so that the worktop cannot be moved manually or automatically to a height that could cause collision. In some cases the simplified interface that is used to input manual and auto-move commands may be used in a different fashion to set maximum and/or minimum HAD heights. For instance, to set a maximum HAD height limit, a user may manually control HAD worktop movement to a height that is just below a shelf and stop movement at that height. Then, in the case of an interface that includes both up and down buttons (see FIG. 6), the user may simultaneously press both the up and down buttons and hold for 5 seconds to set the maximum height, the processor indicating that the maximum height has been set by generating beep or other signal. Minimum HAD height can be set in a similar fashion. Maximum and minimum limits can be erased in a similar fashion (e.g., move the worktop manually to the maximum limit and hold both up and down buttons in for 5 seconds).

In some cases one or both of maximum and minimum HAD heights may be automatically set when certain conditions occur. For instance, referring again to FIG. 2, the table assembly may be equipped with a collision detection sensor 55. Sensor 55 may be designed to detect any time the worktop 24 (FIG. 1) contacts or collides with an object (e.g., a shelf, a file cabinet, etc.) while worktop height is being changed. Many different types of collision sensors are contemplated. When contact with an object occurs, in at least some cases, the assembly drive mechanism will at least halt worktop movement and in preferred cases, the drive mechanism will reverse movement through at least a small stroke to eliminate a case where the worktop is applying pressure to the object. In addition, when an object is contacted at a first collision height, the system may automatically store a maximum or minimum HAD height corresponding to the first collision height to automatically limit subsequent worktop movement. For instance, assume a user uses interface 40 in FIG. 1 to manually move worktop 24 downward and that worktop 24 contacts an object at a 24 inch height, that processor 52 recognizes a collision occurred and reverses the HAD height adjustment to lift worktop 24 to a 25 inch height. At this point, processor 52 may be programmed to automatically recognize that the 24 inch height is in a sitting height range and may store the 25 inch height as a minimum HAD height for manual subsequent height adjustments. Similarly, assume the user uses interface 40 in FIG. 1 to manually move worktop 24 upward and that worktop 24 contacts a shelf above the worktop when the worktop is at a 41 inch height, that processor 52 recognizes a collision occurred and reverses the HAD height adjustment to lower worktop 24 to a 40 inch height. At this point, processor 52 may be programmed to automatically recognize that the 40 inch height is in a standing height range and may store the 40 inch height as a maximum HAD height for manual subsequent height adjustments.

In some cases objects that will obstruct worktop height adjustments may be detected without contact and maximum and/or minimum HAD heights may be set in a fashion similar to that described above. For instance, in some embodiments the FIG. 2 collision detection sensor 55 may be replaced with a light curtain or a time of flight sensor device for detecting objects within a worktop path before or during height adjustment and maximum and minimum HAD heights within standing and sitting height ranges may be auto set without requiring collision.

In some cases maximum and/or minimum HAD heights may only be automatically set once an obstruction is detected repeatedly a threshold number of times. For instance, in some cases a downward movement obstruction may need to be detected three consecutive times for processor 52 to set automatically a new minimum HAD height.

In some cases whenever a new preferred standing height or preferred sitting height is set and stored, processor 52 may generate an audible, visual, or haptic signal indicating that a new height has been set.

To apprise the public of the scope of this invention, the following claims are made:

What is claimed is:

1. A system for adjusting a position of an article of furniture, the system comprising:

the article of furniture including at least a first element that is moveable with respect to a second element, the at least a first element being movable to positions within a range of motion with respect to the second element, the range of motion including first and second position ranges;

a memory storing a first position within the first position range for the first element and a second position within the second position range for the first element;

a user interface for receiving automatic position change commands and manual position change commands; and a processor programmed to perform the steps of, with the first element in a position other than the first position:

a. upon receiving an automatic position change command via the user interface, changing the position of the first element to the first position;

b. upon receiving a manual position change command via the user interface to move the first element to a third position that is different than the first position and the second position:

i. changing the position of the first element to the third position;

ii. determining that the third position is in one of the first position range or the second position range;

iii. when the third position is in the first position range, automatically storing the third position as the first position;

iv. when the third position is in the second position range, automatically storing the third position as the second position; and c. repeating steps (a) and (b).

2. The system of claim 1 wherein the first position range does not overlap the second position range.

3. The system of claim 2 wherein the first position range includes a boundary position and the second position range extends up to the boundary position.

4. The system of claim 3 wherein the range of motion extends between first and second limit positions, the first position range extends from the first limit position to a first boundary position, the second position range extends from a second boundary position to the second limit position, and wherein there are a plurality of first element positions that are not in either of the first or second position ranges and that are between the first and second boundary positions.

5. The system of claim 1 wherein the step of storing the third position as the first position includes tracking duration of time that the first element is in the third position within the first position range and, when the duration of time exceeds a first threshold duration, storing the third position as the first position and the step of storing the third position as the second position includes tracking duration of time that the first element is in the third position within the second position range and, when the duration of time exceeds a second threshold duration, storing the third position as the second position.

6. The system of claim 1 wherein the interface includes first and second independently selectable activation devices, the step of changing the first element to the first position including, upon receiving an automatic position change command via the first activation device, changing the position of the first element to the first position, the processor further programmed to perform the steps of, with the first element in a position other than the second position, upon receiving an automatic position change command via the second activation device, changing the position of the first element to the second position.

7. The system of claim 6 wherein the range of motion extends between first and second limit positions and wherein the first independently selectable activation device is selectable for moving the first element along a first trajectory that extends from the first limit position toward the second limit position and the second independently selectable activation device is selectable for moving the first element along a second trajectory that extends from the second limit position toward the first limit position.

8. The system of claim 7 wherein the first activation device is also selectable to manually move the first element along the first trajectory to a third position, and the second activation device is also selectable to manually move the first element along the second trajectory to a third position.

9. The system of claim 8 wherein a manual position change command is input by persistently selecting the first activation device to move the first element along the first trajectory until the first element is in the third position or persistently selecting the second activation device to move the first element along the second trajectory until the first element is in the third position.

10. The system of claim 9 wherein the automatic position change command is input by a tap and release of the first activation device to move the first element along the first trajectory until the first element is in the first position or by a tap and release of the second activation device to move the first element along the second trajectory until the first element is in the second position.

11. The system of claim 10 wherein each tap and release activation includes a double tap and release activation.

12. The system of claim 1 wherein the article of furniture includes a height adjustable table wherein the second element includes a support structure and the first element includes a worktop member and wherein the first position range includes a standing range and the second position range includes a sitting range.

13. The system of claim 12 wherein the interface includes first and second independently selectable activation devices, the step of changing the first element to the first position including, upon receiving an automatic position change command via the first activation device, changing the position of the first element to the first position, the processor further programmed to perform the steps of, with the first element in a position other than the second position, upon receiving an automatic position change command via the second activation device, changing the position of the first element to the second position, and wherein the range of motion extends between first and second limit positions and wherein the first activation device is selectable for moving the first element along a first trajectory that extends from the first limit position toward the second limit position and the second activation device is selectable for moving the first element along a second trajectory that extends from the second limit position toward the first limit position.

14. The system of claim 13 wherein the automatic position change command to move the worktop to the first position is input by a tap and release of the first activation device wherein the release occurs prior to the worktop reaching the first position, and the automatic position change command to move the worktop to the second position is input by a tap and release of the second activation device wherein the release occurs prior to the worktop reaching the second position.

15. The system of claim 14 wherein each tap and release activation includes a double tap and release activation.

16. The system of claim 15 wherein a manual position change to move the worktop along the first trajectory includes persistently activating the first activation device until the third position is reached and wherein a manual position change to move the worktop along the second trajectory includes persistently activating the second activation device until the third position is reached.

17. The system of claim 16 wherein the interface includes a lever mounted to the worktop wherein the lever includes oppositely facing upper and lower surfaces, the first activation device including the undersurface of the lever and the second activation device including a top surface of the lever.

18. The system of claim 16 wherein the interface includes a display screen and wherein the first activation device includes a first virtual icon presented on the display screen and the second activation device includes a second virtual icon presented on the display screen.

19. The system of claim 16 wherein the step of storing the third position as the first position includes tracking duration of time that the first element is in the third position within the first position range and, when the duration of time exceeds a first threshold duration, storing the third position as the first position and the step of storing the third position as the second position includes tracking duration of time that the first element is in the third position within the second position range and, when the duration of time exceeds a second threshold duration, storing the third position as the second position.

20. A system for adjusting a position of an article of furniture, the system comprising:

the article of furniture including at least a first element that is moveable with respect to a second element, the at least a first element being movable to positions within a range of motion with respect to the second element, the range of motion extending between first and second limit positions and including first and second position ranges;

a memory storing a first position within the first position range for the first element and a second position within the second position range for the first element;

a user interface including first and second independently selectable activation devices, the first activation device selectable to move the first element along a first trajectory that extends from the first limit position toward the second limit position and the second activation device selectable for moving the first element along a second trajectory that extends from the second limit position toward the first limit position; and a processor programmed to perform the steps of:

a. with the first element in a position other than the first position, upon receiving an automatic position change command via the first activation device, changing the position of the first element to the first position;

b. with the first element in a position other than the second position, upon receiving an automatic position change command via the second activation device, changing the position of the first element to the second position;

c. upon receiving a manual position change command via either one of the first activation element and the second activation element to move the first element to a third position that is different than the first position and the second position:

i. changing the position of the first element to the third position;

ii. determining that the third position is in one of the first position range or the second position range;

iii. when the third position is in the first position range, automatically storing the third position as the first position;

iv. when the third position is in the second position range, automatically storing the third position as the second position; and d. repeating steps (a) through (c).

21. The system of claim 20 wherein the article of furniture includes a height adjustable table assembly and wherein the first position range is a standing height range and the second position range is a sitting height range.

22. A system for adjusting a position of an article of furniture, the system comprising:

the article of furniture including at least a first element that is moveable with respect to a second element, the at least a first element being movable to positions within a range of motion with respect to the second element, the range of motion including first through Nth position ranges;

a memory storing first through Nth positions of the first element with respect to the second element within the first through Nth position ranged, respectively;

a user interface for receiving automatic position change commands and manual position change commands; and a processor programmed to perform the steps of, with the first element in an initial position which is one of the first through Nth positions:

a. upon receiving an automatic position change command via the user interface, changing the position of the first element to one of the first through Nth positions other than the initial position;

b. upon receiving a manual position change command via the user interface to move the first element to a new position that is different than any of the first through Nth positions:

i. changing the position of the first element to the new position;

ii. identifying one of the first through Nth position ranges that includes the new position as a selected position range; and iii. automatically replacing the stored position associated with the selected position range with the new position in the memory; and c. repeating steps (a) and (b).

* * * * *